(12) United States Patent
Mann et al.

(10) Patent No.: US 12,409,466 B2
(45) Date of Patent: Sep. 9, 2025

(54) METHOD AND SYSTEM FOR SWITCHING A DISPENSED FLUID IN A NANOFABRICATION DISPENSING SYSTEM

(71) Applicant: CANON KABUSHIKI KAISHA, Tokyo (JP)

(72) Inventors: Tyler Pearce Mann, Reading, PA (US); Steven C. Shackleton, Austin, TX (US)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 18/064,798

(22) Filed: Dec. 12, 2022

(65) Prior Publication Data
US 2024/0189849 A1  Jun. 13, 2024

(51) Int. Cl.
*B05B 12/14* (2006.01)
*B08B 9/032* (2006.01)
*B82Y 40/00* (2011.01)

(52) U.S. Cl.
CPC ............ *B05B 12/14* (2013.01); *B08B 9/0321* (2013.01); *B82Y 40/00* (2013.01)

(58) Field of Classification Search
CPC ........ B05B 12/14; B08B 9/0321; B82Y 40/00
See application file for complete search history.

(56) References Cited

U.S. PATENT DOCUMENTS

| 6,729,360 | B2 | 5/2004 | Sesek et al. |
| 6,936,194 | B2 | 8/2005 | Watts |
| 7,157,036 | B2 | 1/2007 | Choi et al. |
| 8,066,930 | B2 | 11/2011 | Sreenivasan et al. |
| 8,076,386 | B2 | 12/2011 | Xu et al. |
| 8,246,756 | B2 | 8/2012 | Hendrickson et al. |
| 8,349,241 | B2 | 1/2013 | Sreenivasan et al. |
| 2004/0062874 | A1* | 4/2004 | Kim ................. H01L 21/67051 239/102.1 |
| 2020/0339828 | A1 | 10/2020 | Fei et al. |
| 2022/0187721 | A1* | 6/2022 | Sasa ................. H01L 21/67017 |
| 2022/0242137 | A1* | 8/2022 | Taff ....................... B41J 2/1707 |
| 2024/0189849 | A1* | 6/2024 | Mann ....................... B05B 12/14 |

FOREIGN PATENT DOCUMENTS

| CN | 112497926 A | 3/2021 |
| JP | 2003182095 A | 7/2003 |
| JP | 2005058945 A | 3/2005 |
| JP | 2020183065 A | 11/2020 |
| TW | I332393 B | 11/2010 |

* cited by examiner

*Primary Examiner* — Sharidan Carrillo
(74) *Attorney, Agent, or Firm* — Canon U.S.A., Inc. IP Division

(57) ABSTRACT

A method of switching a first fluid supplied to a dispenser with a second fluid. The method includes stopping the first fluid from flowing into a common portion of a flow system, causing a flush fluid to flow through the common portion, stopping the flush fluid from flowing into the common portion, removing the flush fluid from the common portion, causing the second fluid to flow through the common portion, and continuously circulating the first fluid to and from a reservoir without the first liquid entering the common portion of the flow system. The continuously circulating of the first fluid begins a) after stopping the fluid liquid from flowing into the common portion of the flow system and b) prior to or during the second fluid flowing through the common portion of the flow system.

18 Claims, 10 Drawing Sheets

METHOD AND SYSTEM FOR SWITCHING A DISPENSED FLUID IN A NANOFABRICATION DISPENSING SYSTEM

BACKGROUND

Field of Art

The present disclosure relates to a fluid switching method in a dispensing system, and in particular, a method of switching a first fluid supplied to a dispenser with a second fluid in a nanofabrication system.

Description of the Related Art

Nanofabrication includes the fabrication of very small structures that have features on the order of 100 nanometers or smaller. One application in which nano-fabrication has had a sizeable impact is in the fabrication of integrated circuits. The semiconductor processing industry continues to strive for larger production yields while increasing the circuits per unit area formed on a substrate. Improvements in nano-fabrication include providing greater process control and/or improving throughput while also allowing continued reduction of the minimum feature dimensions of the structures formed.

Nanofabrication techniques include nanoimprinting and planarizing. Nanoimprint and planarization is useful in a variety of applications including, for example, fabricating one or more layers of integrated devices by shaping a film on a substrate. Examples of an integrated device include but are not limited to CMOS logic, microprocessors, NAND Flash memory, NOR Flash memory, DRAM memory, MRAM, 3D cross-point memory, Re-RAM, Fe-RAM, STT-RAM, MEMS, optical components, and the like. Exemplary nanofabrication systems using nanoimprinting and planarizing processes are described in detail in numerous publications, such as U.S. Pat. Nos. 8,349,241, 8,066,930, and 6,936,194.

The technique disclosed in each of the aforementioned patents describes the shaping of a film on a substrate by the formation of a relief pattern in a formable material (polymerizable) layer. The shape of this film may then be used to transfer a pattern corresponding to the relief pattern into and/or onto an underlying substrate.

The patterning process uses a template spaced apart from the substrate and the formable material is applied between the template and the substrate. The template is brought into contact with the formable material causing the formable material to spread and fill the space between the template and the substrate. The formable liquid is solidified to form a film that has a shape (pattern) conforming to a shape of the surface of the template that is in contact with the formable liquid. After solidification, the template is separated from the solidified layer such that the template and the substrate are spaced apart.

A planarization technique sometimes referred to as inkjet-based adaptive planarization (IAP) involves dispensing a variable drop pattern of formable material between the substrate and a superstrate, where the drop pattern varies depending on the substrate topography. A superstrate is then brought into contact with the formable material after which the material is polymerized on the substrate, and the superstrate removed.

The substrate and the solidified layer may then be subjected to additional processes, such as etching processes, to transfer an image into the substrate that corresponds to the pattern in one or both of the solidified layer and/or patterned layers that are underneath the solidified layer. The patterned substrate can be further subjected to known steps and processes for device (article) fabrication, including, for example, curing, oxidation, layer formation, deposition, doping, planarization, etching, formable material removal, dicing, bonding, and packaging, and the like.

In nanofabrication systems, depending on the product being manufactured, the process requires switching from dispensing one formable material to dispensing another formable material. In known systems, switching materials can take significant time and waste a great deal of formable material, which increases costs. Typically, in conventional systems, in order to change the formable material supplied to the dispenser, the operator must shut down and drain the existing first material from a reservoir, fill the reservoir with a second material, circulate the second material, shut down and drain the second material, fill the reservoir again with more of the second material, circulate the new second material again, and repeat the steps of filling/circulating/draining two or more times. Thus, there is a need in the art for a method of switching a first fluid supplied to a dispenser with a second fluid that takes less time and avoids wasting materials.

SUMMARY

A method of switching a first fluid supplied to a dispenser with a second fluid, the method comprises stopping the first fluid from flowing into a common portion of a flow system, the common portion including: a supply manifold, the dispenser, a return manifold, a supply path providing fluid communication between the supply manifold and the dispenser, and a return path providing fluid communication between the dispenser and the return manifold, causing a flush fluid to flow through the common portion of the flow system, stopping the flush fluid from flowing into the common portion of the flow system, removing the flush fluid from the common portion of the flow system, causing the second fluid to flow through the common portion of the flow system, and continuously circulating the first fluid to and from a reservoir without the first liquid entering the common portion of the flow system, wherein the continuously circulating of the first fluid begins a) after stopping the fluid liquid from flowing into the common portion of the flow system and b) prior to or during the second fluid flowing through the common portion of the flow system.

A dispensing system comprises a flow system having a common portion, the common portion including a supply manifold, a dispenser, a return manifold, a supply path providing fluid communication between the supply manifold and the dispenser, and a return path providing fluid communication between the dispenser and the return manifold, one or more processors, and one or more memories storing instructions, when executed by the one or more processors, causes the dispensing system to: stop a first fluid from flowing into the common portion of a flow system, cause a flush fluid to flow through the common portion of the flow system, stop the flush fluid from flowing into the common portion of the flow system, remove the flush fluid from the common portion of the flow system, cause a second fluid to flow through the common portion of the flow system, and continuously circulate the first fluid to and from a reservoir without the first liquid entering the common portion of the flow system, wherein the continuously circulating of the first fluid begins a) after stopping the fluid liquid from flowing into the common portion of the flow system and b) prior to or during the second fluid flowing through the common portion of the flow system.

A method of making an article comprises stopping a first fluid from flowing into a common portion of a flow system, the common portion including a supply manifold, the dispenser, a return manifold, a supply path providing fluid communication between the supply manifold and the dispenser, and a return path providing fluid communication between the dispenser and the return manifold, causing a flush fluid to flow through the common portion of the flow system, stopping the flush fluid from flowing into the common portion of the flow system, removing the flush fluid from the common portion of the flow system, causing the second fluid to flow through the common portion of the flow system, continuously circulating the first fluid to and from a reservoir without the first liquid entering the common portion of the flow system, wherein the continuously circulating of the first fluid begins a) after stopping the fluid liquid from flowing into the common portion of the flow system and b) prior to or during the second fluid flowing through the common portion of the flow system, dispensing the second fluid onto a substrate using the dispenser, forming a pattern or a layer of the dispensed fluid on the substrate, and processing the formed pattern or layer to make the article.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

So that features and advantages of the present disclosure can be understood in detail, a more particular description of embodiments of the disclosure may be had by reference to the embodiments illustrated in the appended drawings. It is to be noted, however, that the appended drawings only illustrate typical embodiments of the disclosure, and are therefore not to be considered limiting of its scope, for the disclosure may admit to other equally effective embodiments.

Figure 1:
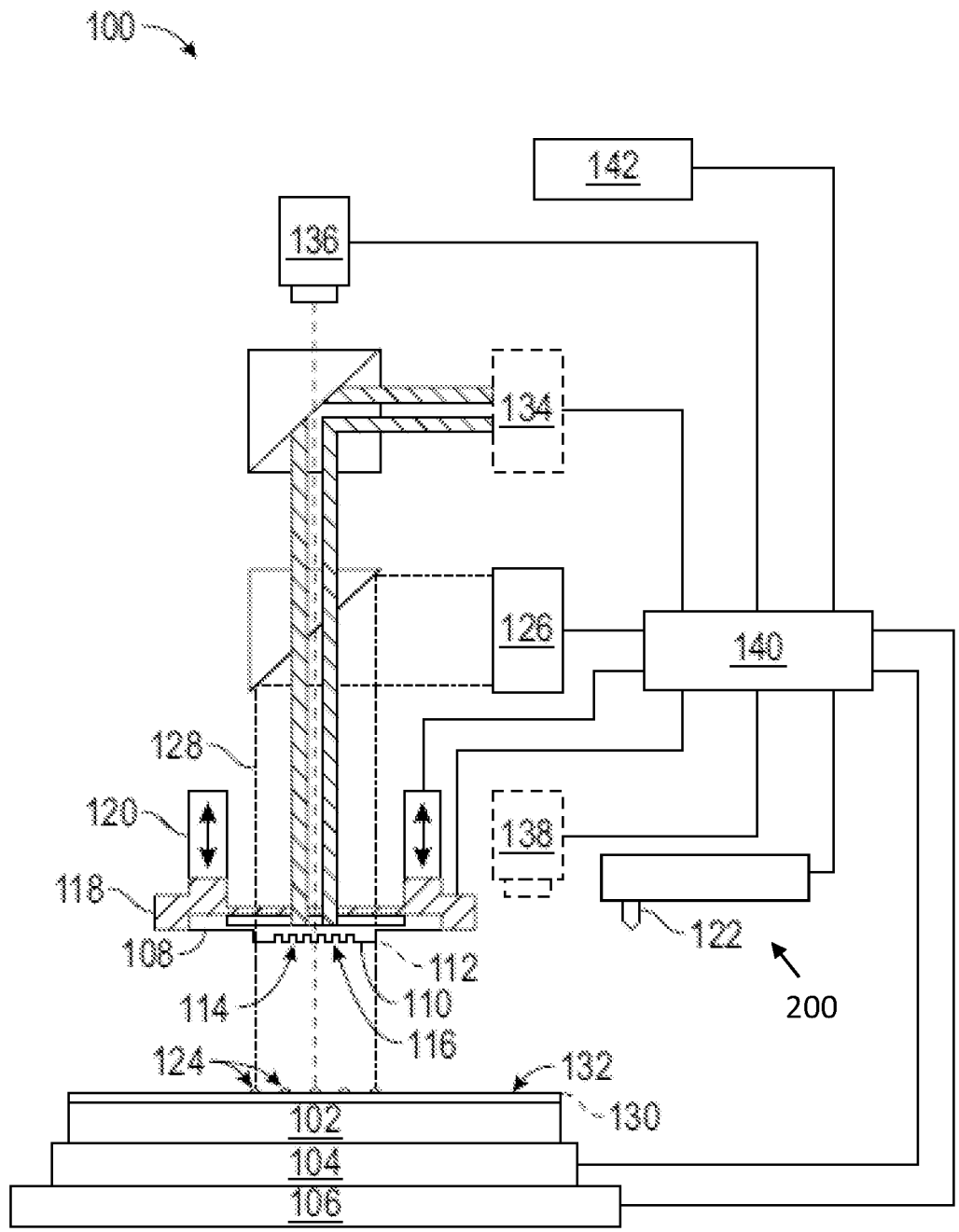
FIG. 1 is an illustration of an example nanofabrication system in accordance with an example embodiment.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Throughout this disclosure, reference is made primarily to nanoimprint lithography, which uses the above-mentioned patterned template to impart a pattern onto formable liquid. However, as mentioned below, in an alternative embodiment, the template is featureless in which case a planar surface may be formed on the substrate. In such embodiments where a planar surface is formed, the formation process is referred to as planarization. Thus, throughout this disclosure, whenever nanoimprint lithography is mentioned, it should be understood that the same method is applicable to planarization. The term superstrate is used in place of the term template in instances where the template is featureless.

As noted above, a known method of switching fluids to a dispenser in fabrication requires significant time and causes material waste. Thus, it desirable for a method of switching a first fluid supplied to a dispenser with a second fluid that avoids these disadvantages.

Nanofabrication System (Shaping System)

FIG. 1 is an illustration of a nanoimprint lithography system 100 in which an embodiment may be implemented. The nanoimprint lithography system 100 is used to shape a film on a substrate 102. The substrate 102 may be coupled to a substrate chuck 104. The substrate chuck 104 may be but is not limited to a vacuum chuck, pin-type chuck, groove-type chuck, electrostatic chuck, electromagnetic chuck, and/or the like.

The substrate 102 and the substrate chuck 104 may be further supported by a substrate positioning stage 106. The substrate positioning stage 106 may provide translational and/or rotational motion along one or more of the x, y, z, θ, and φ-axes. The substrate positioning stage 106, the substrate 102, and the substrate chuck 104 may also be positioned on a base (not shown). The substrate positioning stage may be a part of a positioning system.

Spaced-apart from the substrate 102 is a template 108. The template 108 may include a body having a mesa (also referred to as a mold) 110 extending towards the substrate 102 on a front side of the template 108. The mesa 110 may have a patterning surface 112 thereon also on the front side of the template 108. Alternatively, the template 108 may be formed without the mesa 110, in which case the surface of the template facing the substrate 102 is equivalent to the mold 110 and the patterning surface 112 is that surface of the template 108 facing the substrate 102.

The template 108 may be formed from such materials including, but not limited to, fused-silica, quartz, silicon, organic polymers, siloxane polymers, borosilicate glass, fluorocarbon polymers, metal, hardened sapphire, and/or the like. The patterning surface 112 may have features defined by a plurality of spaced-apart template recesses 114 and/or template protrusions 116. The patterning surface 112 defines a pattern that forms the basis of a pattern to be formed on the substrate 102. In an alternative embodiment, the patterning surface 112 is featureless in which case a planar surface is formed on the substrate. In an alternative embodiment, the patterning surface 112 is featureless and the same size as the substrate and a planar surface is formed across the entire substrate. In such embodiments where a planar surface is formed, the formation process may be alternatively referred to as planarization and the featureless template may be alternatively referred to as a superstrate.

The template 108 may be coupled to a template chuck 118. The template chuck 118 may be, but is not limited to, vacuum chuck, pin-type chuck, groove-type chuck, electrostatic chuck, electromagnetic chuck, and/or other similar chuck types. The template chuck 118 may be configured to apply stress, pressure, and/or strain to template 108 that varies across the template 108. The template chuck 118 may include piezoelectric actuators which can squeeze and/or stretch different portions of the template 108. The template chuck 118 may include a system such as a zone based vacuum chuck, an actuator array, a pressure bladder, etc. which can apply a pressure differential to a back surface of the template causing the template to bend and deform.

The template chuck 118 may be coupled to an imprint head 120 which is a part of the positioning system. The imprint head may be moveably coupled to a bridge. The imprint head may include one or more actuators such as voice coil motors, piezoelectric motors, linear motor, nut and screw motor, etc., which are configured to move the template chuck 118 relative to the substrate in at least the z-axis direction, and potentially other directions (e.g., x, y, θ, ψ, and φ-axes).

The nanoimprint lithography system 100 may further comprise a fluid supply and dispensing system 200 that includes a fluid dispenser 122 among other components discussed below in more detail. The fluid dispenser 122 may also be moveably coupled to the bridge. In an embodiment, the fluid dispenser 122 and the imprint head 120 share one or more or all positioning components. In an alternative embodiment, the fluid dispenser 122 and the imprint head 120 move independently from each other. The fluid dispenser 122 may be used to deposit liquid formable material 124 (e.g., polymerizable material) onto the substrate 102 in a pattern. Additional formable material 124 may also be added to the substrate 102 using techniques, such as, drop dispense, spin-coating, dip coating, chemical vapor deposition (CVD), physical vapor deposition (PVD), thin film deposition, thick film deposition, and/or the like prior to the formable material 124 being deposited onto the substrate 102. The formable material 124 may be dispensed upon the substrate 102 before and/or after a desired volume is defined between the mold 112 and the substrate 102 depending on design considerations. The formable material 124 may comprise a mixture including a monomer as described in U.S. Pat. Nos. 7,157,036 and 8,076,386, both of which are herein incorporated by reference. The formable material is alternatively referred herein simply as "fluid" or "fluid material." The formable material (fluid, fluid material) is in a liquid state. Furthermore, the terms "first fluid," "second fluid," etc. refers to different instances of the formable material Different fluid dispensers 122 may use different technologies to dispense formable material 124. When the formable material 124 is jettable, ink jet type dispensers may be used to dispense the formable material. For example, thermal ink jetting, microelectromechanical systems (MEMS) based ink jetting, valve jet, and piezoelectric ink jetting are common techniques for dispensing jettable liquids.

The nanoimprint lithography system 100 may further comprise a radiation source 126 that directs actinic energy along an exposure path 128. The imprint head and the substrate positioning stage 106 may be configured to position the template 108 and the substrate 102 in superimposition with the exposure path 128. The radiation source 126 sends the actinic energy along the exposure path 128 after the template 108 has made contact with the formable material 128. FIG. 1 illustrates the exposure path 128 when the template 108 is not in contact with the formable material 124, this is done for illustrative purposes so that the relative position of the individual components can be easily identified. An individual skilled in the art would understand that exposure path 128 would not substantially change when the template 108 is brought into contact with the formable material 124.

The nanoimprint lithography system 100 may further comprise a field camera 136 that is positioned to view the spread of formable material 124 after the template 108 has made contact with the formable material 124. FIG. 1 illustrates an optical axis of the field camera's imaging field as a dashed line. As illustrated in FIG. 1 the nanoimprint lithography system 100 may include one or more optical components (dichroic mirrors, beam combiners, prisms, lenses, mirrors, etc.) which combine the actinic radiation with light to be detected by the field camera. The field camera 136 may be configured to detect the spread of formable material under the template 108. The optical axis of the field camera 136 as illustrated in FIG. 1 is straight but may be bent by one or more optical components. The field camera 136 may include one or more of a CCD, a sensor array, a line camera, and a photodetector which are configured to gather light that has a wavelength that shows a contrast between regions underneath the template 108 that are in contact with the formable material, and regions underneath the template 108 which are not in contact with the formable material 124. The field camera 136 may be configured to gather monochromatic images of visible light. The field camera 136 may be configured to provide images of the spread of formable material 124 underneath the template 108, the separation of the template 108 from cured formable material, and can be used to keep track the progress over the imprinting process.

The nanoimprint lithography system 100 may further comprise a droplet inspection system 138 that is separate from the field camera 136. The droplet inspection system 138 may include one or more of a CCD, a camera, a line camera, and a photodetector. The droplet inspection system 138 may include one or more optical components such as lenses, mirrors, apertures, filters, prisms, polarizers, windows, adaptive optics, and/or light sources. The droplet inspection system 138 may be positioned to inspect droplets prior to the patterning surface 112 contacting the formable material 124 on the substrate 102.

The nanoimprint lithography system 100 may further include a thermal radiation source 134 which may be configured to provide a spatial distribution of thermal radiation to one or both of the template 108 and the substrate 102.

The thermal radiation source 134 may include one or more sources of thermal electromagnetic radiation that will heat up one or both of the substrate 102 and the template 108 and does not cause the formable material 124 to solidify. The thermal radiation source 134 may include a spatial light modulator such as a digital micromirror device (DMD), Liquid Crystal on Silicon (LCoS), Liquid Crystal Device (LCD), etc., to modulate the spatial temporal distribution of thermal radiation. The nanoimprint lithography system may further comprise one or more optical components which are used to combine the actinic radiation, the thermal radiation, and the radiation gathered by the field camera 136 onto a single optical path that intersects with the imprint field when the template 108 comes into contact with the formable material 124 on the substrate 102. The thermal radiation source 134 may send the thermal radiation along a thermal radiation path (which in FIG. 1 is illustrated as 2 thick dark lines) after the template 108 has made contact with the formable material 124. FIG. 1 illustrates the thermal radiation path when the template 108 is not in contact with the formable material 124, this is done for illustrative purposes so that the relative position of the individual components can be easily identified. An individual skilled in the art would understand that the thermal radiation path would not substantially change when the template 108 is brought into contact with the formable material 124. In FIG. 1 the thermal radiation path is shown terminating at the template 108, but it may also terminate at the substrate 102. In an alternative embodiment, the thermal radiation source 134 is underneath the substrate 102, and thermal radiation path is not combined with the actinic radiation and visible light.

Prior to the formable material 124 being dispensed onto the substrate, a substrate coating 132 may be applied to the substrate 102. In an embodiment, the substrate coating 132 may be an adhesion layer. In an embodiment, the substrate coating 132 may be applied to the substrate 102 prior to the substrate being loaded onto the substrate chuck 104. In an alternative embodiment, the substrate coating 132 may be applied to substrate 102 while the substrate 102 is on the substrate chuck 104. In an embodiment, the substrate coating 132 may be applied by spin coating, dip coating, etc. In an embodiment, the substrate 102 may be a semiconductor wafer. In another embodiment, the substrate 102 may be a blank template (replica blank) that may be used to create a daughter template after being imprinted.

The nanoimprint lithography system 100 may be regulated, controlled, and/or directed by one or more processors 140 (controller) in communication with one or more components and/or subsystems such as the substrate chuck 104, the substrate positioning stage 106, the template chuck 118, the imprint head 120, the fluid dispenser 122, the radiation source 126, the thermal radiation source 134, the field camera 136 and/or the droplet inspection system 138. The processor 140 may operate based on instructions in a computer readable program stored in a non-transitory computer readable memory 142. The processor 140 may be or include one or more of a CPU, MPU, GPU, ASIC, FPGA, DSP, and a general purpose computer. The processor 140 may be a purpose built controller or may be a general purpose computing device that is adapted to be a controller. Examples of a non-transitory computer readable memory include but are not limited to RAM, ROM, CD, DVD, Blu-Ray, hard drive, networked attached storage (NAS), an intranet connected non-transitory computer readable storage device, and an internet connected non-transitory computer readable storage device.

Either the imprint head 120, the substrate positioning stage 106, or both varies a distance between the mold 110 and the substrate 102 to define a desired space (a bounded physical extent in three dimensions) that is filled with the formable material 124. For example, the imprint head 120 may apply a force to the template 108 such that mold 110 is in contact with the formable material 124. After the desired volume is filled with the formable material 124, the radiation source 126 produces actinic radiation (e.g., UV, 248 nm, 280 nm, 350 nm, 365 nm, 395 nm, 400 nm, 405 nm, 435 nm, etc.) causing formable material 124 to cure, solidify, and/or cross-link; conforming to a shape of the substrate surface 130 and the patterning surface 112, defining a patterned layer on the substrate 102. The formable material 124 is cured while the template 108 is in contact with formable material 124 forming the patterned layer on the substrate 102. Thus, the nanoimprint lithography system 100 uses an imprinting process to form the patterned layer which has recesses and protrusions which are an inverse of the pattern in the patterning surface 112. In an alternative embodiment, the nanoimprint lithography system 100 uses an imprinting process to form the planar layer with a featureless patterning surface 112.

The imprinting process may be done repeatedly in a plurality of imprint fields that are spread across the substrate surface 130. Each of the imprint fields may be the same size as the mesa 110 or just the pattern area of the mesa 110. The pattern area of the mesa 110 is a region of the patterning surface 112 which is used to imprint patterns on a substrate 102 which are features of the device or are then used in subsequent processes to form features of the device. The pattern area of the mesa 110 may or may not include mass velocity variation features which are used to prevent extrusions. In an alternative embodiment, the substrate 102 has only one imprint field which is the same size as the substrate 102 or the area of the substrate 102 which is to be patterned with the mesa 110. In an alternative embodiment, the imprint fields overlap. Some of the imprint fields may be partial imprint fields which intersect with a boundary of the substrate 102.

The patterned layer may be formed such that it has a residual layer having a residual layer thickness (RLT) that is a minimum thickness of formable material 124 between the substrate surface 130 and the patterning surface 112 in each imprint field. The patterned layer may also include one or more features such as protrusions which extend above the residual layer having a thickness. These protrusions match the recesses 114 in the mesa 110.

Template/Superstrate

Figure 2:
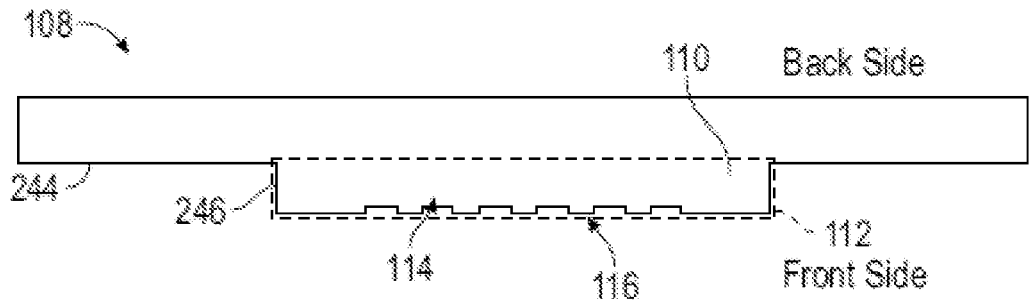
FIG. 2 is an illustration of an example template in accordance with an example embodiment.

FIG. 2 is an illustration of a template 108 that may be used in an embodiment. The patterning surface 112 may be on a mesa 110 (identified by the dashed box in FIG. 2). The mesa 110 is surrounded by a recessed surface 244 on the front side of the template. Mesa sidewalls 246 connect the recessed surface 244 to patterning surface 112 of the mesa 110. The mesa sidewalls 246 surround the mesa 110. In an embodiment in which the mesa is round or has rounded corners, the mesa sidewalls 246 refers to a single mesa sidewall that is a continuous wall without corners.

An alternative plate may be used in another embodiment, referred herein as a superstrate. In the case of the superstrate, the patterning surface 112 is featureless. That is, in an embodiment there is no pattern on the surface 112. A superstrate with no pattern is used in a planarization process. Thus, when a planarization process is performed, the superstrate is used in place of the template shown in FIG. 1.

Imprinting/Planarizing Process

Figure 3:
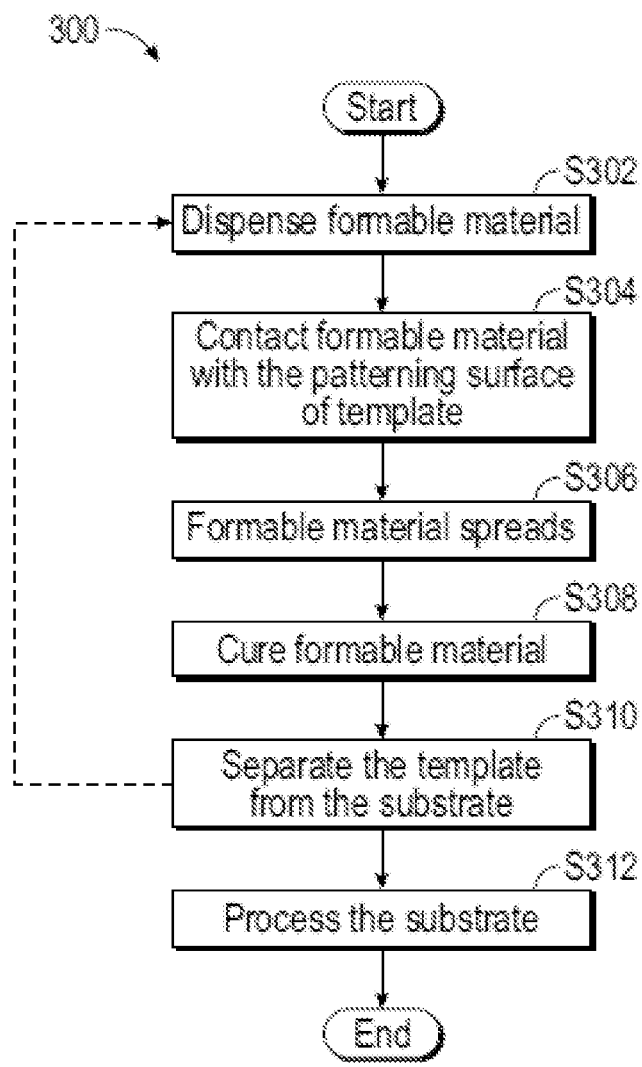
FIG. 3 is a flowchart illustrating an example nanofabrication method in accordance with an example embodiment.

FIG. 3 is a flowchart of an imprinting process 300 by the nanoimprint lithography system 100 that can be used to form patterns in formable material 124 on one or more imprint fields (also referred to as: pattern areas or shot areas). The imprinting process 300 may be performed repeatedly on a plurality of substrates 102 by the nanoimprint lithography system 100. The processor 140 may be used to control imprinting process 300.

In an alternative embodiment, a similar process may be performed to planarize the substrate 102. In the case of planarizing, substantially the same steps discussed herein with respect to FIG. 3 are performed, except that a patternless superstrate is used in place of the template. Thus, it should be understood that the following description is also applicable to a planarizing method. When using as superstrate, the superstrate may be the same size or larger than the substrate 102.

The beginning of the imprinting process 300 may include a template mounting step causing a template conveyance mechanism to mount a template 108 onto the template chuck 118. The imprinting process may also include a substrate mounting step, the processor 140 may cause a substrate conveyance mechanism to mount the substrate 102 onto the substrate chuck 104. The substrate may have one or more coatings and/or structures. The order in which the template 108 and the substrate 102 are mounted onto the nanoimprint lithography system 100 is not particularly limited, and the template 108 and the substrate 102 may be mounted sequentially or simultaneously.

In a positioning step, the processor 140 may cause one or both of the substrate positioning stage 106 and/or a dispenser positioning stage to move an imprint field i (index i may be initially set to 1) of the substrate 102 to a fluid dispense position below the fluid dispenser 122. The substrate 102, may be divided into N imprint fields, wherein each imprint field is identified by an index i. In which N is a real integer such as 1, 10, 75, etc. $\{N \in \mathbb{Z}^+\}$. In a dispensing step S302, the processor 140 may cause the fluid dispenser 122 to dispense formable material onto an imprint field i. In an embodiment, the fluid dispenser 122 dispenses the formable material 124 as a plurality of droplets. The fluid dispenser 122 may include one nozzle or multiple nozzles. The fluid dispenser 122 may eject formable material 124 from the one or more nozzles simultaneously. The imprint field i may be moved relative to the fluid dispenser 122 while the fluid dispenser is ejecting formable material 124. Thus, the time at which some of the droplets land on the substrate may vary across the imprint field i. In an embodiment, during the dispensing step S302, the formable material 124 may be dispensed onto a substrate in accordance with a drop pattern. The drop pattern may include information such as one or more of position to deposit drops of formable material, the volume of the drops of formable material, type of formable material, shape parameters of the drops of formable material, etc.

After, the droplets are dispensed, then a contacting step S304 may be initiated, the processor 140 may cause one or both of the substrate positioning stage 106 and a template positioning stage to bring the patterning surface 112 of the template 108 into contact with the formable material 124 in imprint field i.

During a spreading step S306, the formable material 124 then spreads out towards the edge of the imprint field i and the mesa sidewalls 246. The edge of the imprint field may be defined by the mesa sidewalls 246. How the formable material 124 spreads and fills the mesa can be observed via the field camera 136 and may be used to track a progress of a fluid front of formable material.

In a curing step S308, the processor 140 may send instructions to the radiation source 126 to send a curing illumination pattern of actinic radiation through the template 108, the mesa 110 and the patterning surface 112. The curing illumination pattern provides enough energy to cure (polymerize) the formable material 124 under the patterning surface 112.

In a separation step S310, the processor 140 uses one or more of the substrate chuck 104, the substrate positioning stage 106, template chuck 118, and the imprint head 120 to separate the patterning surface 112 of the template 108 from the cured formable material on the substrate 102.

If there are additional imprint fields to be imprinted then the process moves back to step S302. In an embodiment, additional processing is performed on the substrate 102 in a processing step S312 so as to create an article of manufacture (e.g., semiconductor device or an optical component). In an embodiment, each imprint field includes a plurality of devices.

The further processing in processing step S312 may include etching processes to transfer a relief image into the substrate that corresponds to the pattern in the patterned layer or an inverse of that pattern. The further processing in processing step S312 may also include known steps and processes for article fabrication, including, for example, curing, oxidation, layer formation, deposition, doping, planarization, etching, formable material removal, dicing, bonding, and packaging, and the like. The substrate 102 may be processed to produce a plurality of articles (devices).

Supply and Dispensing System

Figure 4:
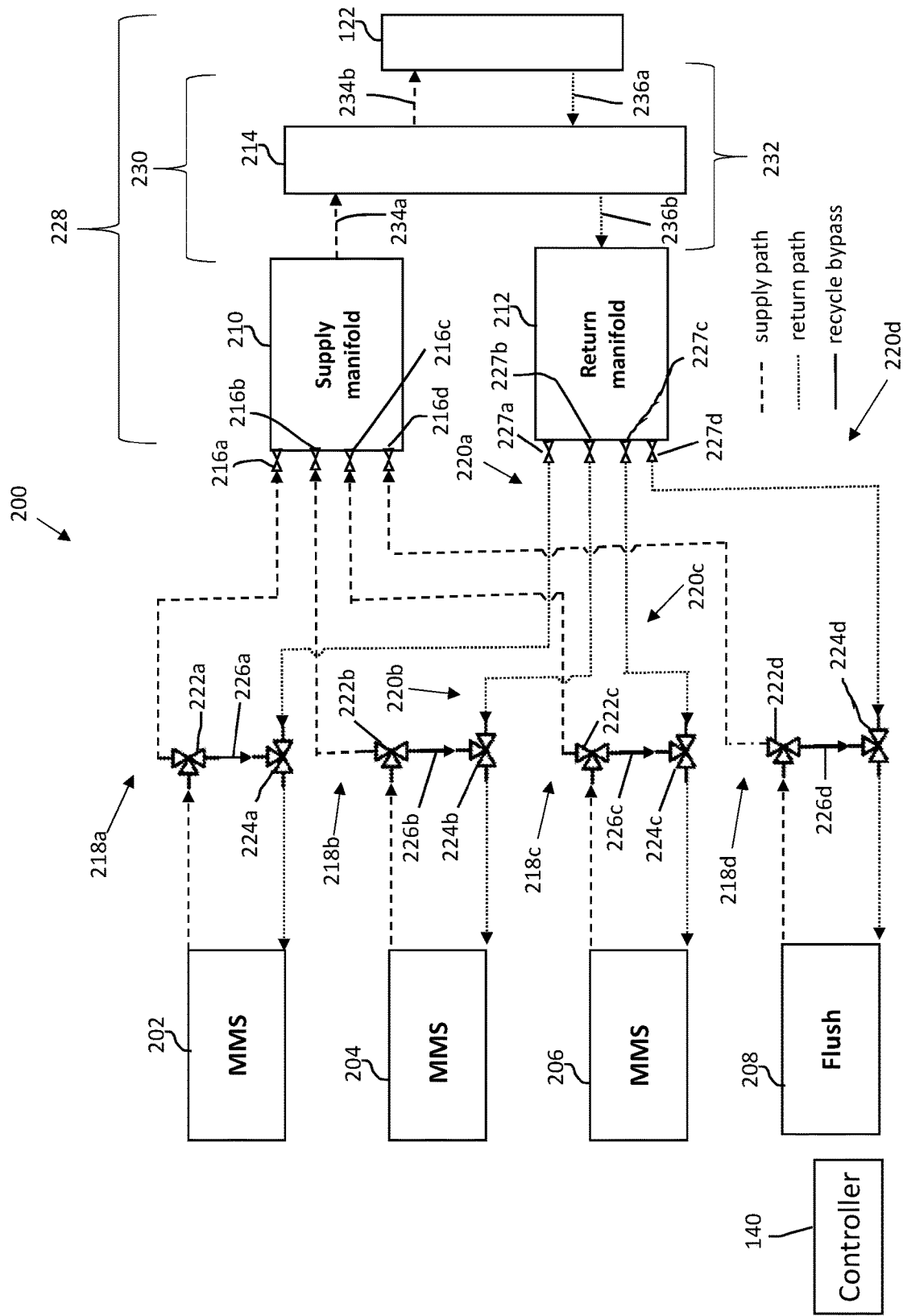
FIG. 4 is a schematic representation of a flow system in accordance with an example embodiment.

As noted above, the nanoimprint lithography system 100 includes a supply and dispensing system 200, alternatively referred herein as a "flow system." The supply and dispensing system 200 generally includes two or more material management systems and one or more flush systems. FIG. 4 shows a schematic representation of an example embodiment of the supply and dispensing system 200. As shown in FIG. 4, the example supply and dispensing system 200 includes a first material management system (MMS) 202, a second MMS 204, a third MMS 206, a flush system 208, a supply manifold 210, a return manifold 212, a pressure manifold 214, and one or more dispensers 122. The one or more dispensers 122 are alternatively referred herein as "dispenser(s)." Each of the first MMS 202, the second MMS 204, the third MMS 206, and the flush system 208 are in fluid communication with the one or more dispensers 122 via a supply flow path 218a, 218b, 218c, 218d and return flow path 220a, 220b, 220c, 220d. Each of the supply flow paths 218a, 218b, 218c, 218d travel from the corresponding MMS/flush system 202, 204, 206, 208, through a supply three-way valve 222a, 222b, 222c, 222d, through the supply manifold 210, through the pressure manifold 214, and finally to the one or more dispensers 122. Each of the return flow paths 220a, 220b, 220c, 220d travels from the one or more dispensers 122, through the pressure manifold 214, through the return manifold 212, through a return three-way valve 224a, 224b, 224c, 224d, and finally returning to the corresponding MMS/flush system 202, 204, 206, 208. In FIG. 4, the supply paths have been designated with dashed lines and the return paths have been designated with dotted lines. As also shown in FIG. 4, and as will be discussed in more detail below, because each of the MMS/flush systems 202, 204, 206, 208 has a supply three-way valve 222a, 222b, 222c, 222d and a return three-way valve 224a, 224b, 224c, 224d associated with it, it is possible to configure the flow of material exiting one or more of the MMS/flush systems to enter a recycle bypass 226a, 226b, 226c, 226d. In such a case, the fluid exiting the MMS/flush system enters the supply three-way valve 222a, 222b, 222c, 222d, where the supply three-way valve 222a, 222b, 222c, 222d is configured to route the fluid into the recycle bypass line 226a, 226b, 226c, 226d so that the fluid travels directly to the return three-way valve 224a, 224b, 224c, 224d without traveling through any of the supply manifold 210, the pressure manifold 214, the dispenser(s) 122, and the return manifold 212.

The dispenser(s) 122 are the same dispensers discussed above with respect to FIG. 1. The supply manifold 210 is a fitting that receives fluid from multiple separate sources (i.e., from the separate MMS and flush systems) via separate supply tubes and directs the fluid to one or more outlet ports. The supply manifold 210 has a number of inlet ports equal to the total number of MMS and flush systems and one or more outlet ports. After fluid passes through the supply manifold 210 and exits the one or more outlet ports, the exiting fluid is combined into a single outlet conduit leading to the pressure manifold 214. As shown in FIG. 4, four valves 216a, 216b, 216c, 216d may be used to allow or prevent fluid from a particular MMS or flush system from entering into the supply manifold 210. The first valve 216a (first supply valve) is in communication with the first MMS 202, the second valve 216b (second supply valve) is in communication with the second MMS 204, the third valve 216c (third supply valve) is in communication with the third MMS 206, and the fourth valve 216d (fourth supply valve) is in communication with the flush system 210. Depending on which of the valves 216a, 216b, 216c, 216d are open, fluid will be able to flow into the supply manifold 210 and out to the pressure manifold 214.

The return manifold 212 is the reverse of the supply manifold 210. That is, the return manifold 212 is a fitting that receives fluid from a single input (i.e., from the pressure manifold 214) and then directs the fluid to multiple separate outputs (i.e., to the separate MMS and flush systems) via separate return tubes. The return manifold 212 has a number of outlet ports equal to the total number of MMS and flush systems and one or more inlet ports. After fluid coming from the pressure manifold 214 passes into the return manifold 212, the exiting fluid is directed into one of the outlet ports. As shown in FIG. 4, four valves 227a, 227b, 227c, 227d may be used to allow or prevent the flow of fluid to a particular one of the MMS or flush systems. The first valve 227a (first return valve) is in communication with the first MMS 202, the second valve 227b (second return valve) is in communication with the second MMS 204, the third valve 227c (third return valve) is in communication with the third MMS 206, and the fourth valve 227d (fourth return valve) is in communication with the flush system 210. Depending on which of the valves 216a, 216b, 216c, 216d are open, fluid will flow into the supply manifold 210 and out to the pressure manifold 214.

The pressure manifold is has independent supply and return fluid inputs and outputs. The pressure manifold has a supply pressure sensor, supply temperature sensor, return pressure sensor, and return temperature sensor. The sensors provide feedback to the MMS's on how the pressure and temperature should be adjusted (via pumps and heat exchangers) to meet the specified target pressure and target temperature of the formable material at the dispenser. The supply and return pressures are controlled to be close to each other to control the meniscus at the dispenser.

While three different MMS and one flush are shown in FIG. 4, the number of MMS and flush systems is not limited. That is, the method described herein is applicable to a system with as many MMS and flush systems as desired. For example, flow system may include 2 to 10 MMS and 1 to 3 flush systems.

It should be understood that FIG. 4 is generic and shows all possible flow paths to/from the MMS/flush systems, as opposed to particular instances where certain flow paths are active and certain flow paths are inactive. That is, FIG. 4 does not show any particular state/moment of the method described herein. The controller 140 is configured to control all of the controllable elements of the supply and dispensing system 200, i.e., pumps, valves, etc., which changes the flow states. That is, the controller 140 is configured to perform the method 700 described below.

Figure 5:
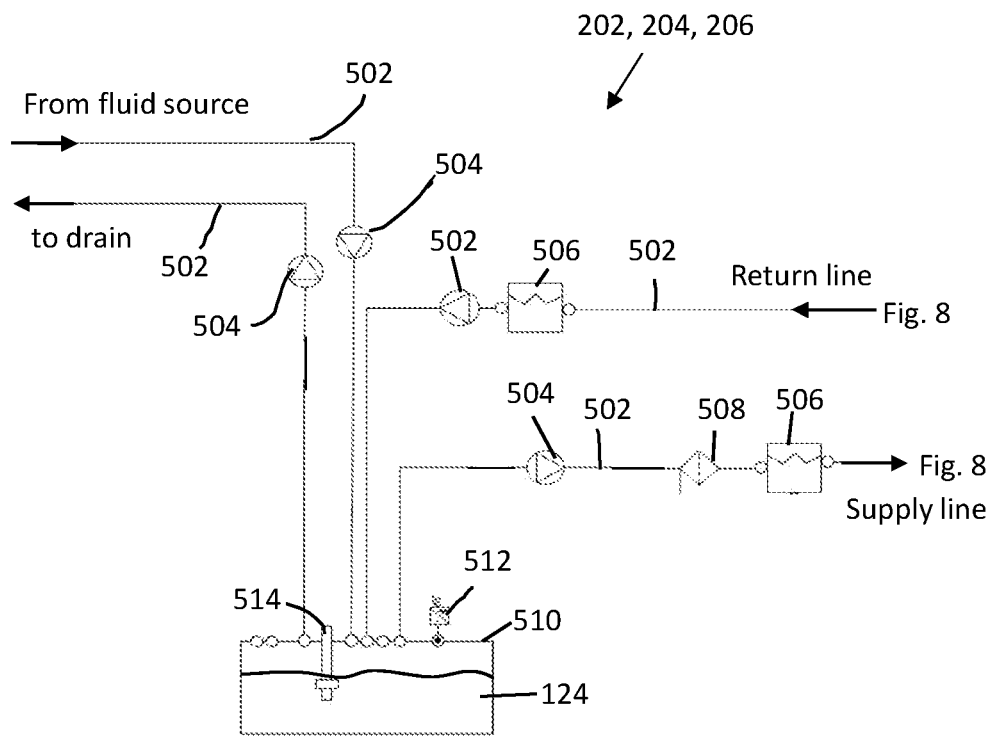
FIG. 5 is a schematic representation of material management system in accordance with an example embodiment.

FIG. 5 shows a schematic representation of an example embodiment of a MMS. Each of the MMS 202, 204, 206 have the same components as illustrated in FIG. 5. The only difference between the MMS 202, 204, 206 is that each one could have a different fluid/formable material than the others. That is, while the fluid in every MMS is the formable material described above, the particular formulation may be different depending on the particular fabrication. The formable material for each MMS may be a photocurable composition comprising a photoinitiator and monomers. Exemplar monomers which may be in the photocurable composition include: acrylate monomers; vinyl monomers; styrenic monomers; etc. The formable material may have the composition described in U.S. Pat. App. Pub. No. 2020/0339828, which is hereby expressly incorporated by reference herein. As discussed in U.S. Pat. App. Pub. No. 2020/0339828, the formable material may be a photocurable composition comprising a polymerizable material and a photoinitiator, wherein at least 90 wt % of the polymerizable material may comprise acrylate monomers including an aromatic group. The photocurable composition can have a viscosity of not greater than 10, 15, 20, or 30 mPa-s, the total carbon content of the photocurable composition after curing can be at least 73%, and the Ohnishi number may be not greater than 3.0. At least 90 wt % of the polymerizable material can include monomers containing an aromatic group in their chemical structure. Some non-limiting examples of monomers comprising an aromatic group can be: benzyl acrylate (BA), benzyl methacrylate (BMA), 1-naphthyl methacrylate (1-NMA), bisphenol A dimethacrylate (BPADMA), 1-naphthyl acrylate (1-NA), 2-naphthyl acrylate (2-NA), 9,9-bis[4-(2-acryloyloxy ethoxy) phenyl] fluorine (A-BPEF), 9-fluorene methacrylate (9-FMA), 9-fluorene acrylate (9-FA), o-phenylbenzyl acrylate (o-PBA), bisphenol A diacrylate (BPADA), propenoic acid, 1,1'-[1,1'-binaphthalene]-2,2'-diyl ester (BNDA), styrene, divinyl benzene (DVB). Further details of the composition may be found in U.S. Pat. App. Pub. No. 2020/0339828. Some non-limiting examples of suitable monofunctional (meth)acrylates to be included in the polymerizable material are: isobornyl acrylate; 3,3,5-trimethylcyclohexyl acrylate; dicyclopentenyl acrylate; dicyclopentanyl acrylate; dicyclopentenyl oxyethyl acrylate; benzyl acrylate; naphthyl acrylate; 2-phenylethyl acrylate; 2-phenoxyethyl acrylate; phenyl acrylate; (2-ethyl-2-methyl-1,3-dioxolan-4-yl)methyl acrylate; o-phenyl benzyl acrylate; butyl acrylate; ethyl acrylate; methyl acrylate; n-hexyl acrylate; 2-ethyl hexyl acrylate; 4-tert-butylcyclohexyl acrylate; methoxy polyethylene glycol (350) monoacrylate; 2-methoxyethyl acrylate; lauryl acrylate; stearyl acrylate; 9-fluorene acrylate. Some non-limiting examples of suitable diacrylates to be included in the polymerizable material are: ethylene glycol diacrylate; diethylene glycol diacrylate; triethylene glycol diacrylate; tetraethylene glycol diacrylate; 1,2-propanediol diacrylate; dipropylene glycol diacrylate; tripropylene glycol diacrylate; polypropylene glycol diacrylate; 1,3-propanediol diacrylate; 1,4-butanediol diacrylate; 2-butene-1,4-diacrylate; 1,3-butylene glycol diacrylate; 3-methyl-1,3-butanediol diacrylate; 1,5-pentanediol diacrylate; 3-Methyl-1,5-pentanediol diacrylate; neopentyl glycol diacrylate; tricyclodecane dimethanol diacrylate; 1,6-hexanediol diacrylate; 1,9-nonanediol diacrylate; 1,10-decanediol diacrylate; 1,12-dodecanediol diacrylate; cyclohexane dimethanol diacrylate; bisphenol A diacrylate; ethoxylated bisphenol A diacrylate; m-xylylene diacrylate; 9,9-bis[4-(2-acryloyloxy ethoxy) phenyl]fluorine; 2,2'-diacrylate-1,1'-binaphthalene; dicyclopentanyl diacrylate; 1,2-adamantanediol diacrylate; 2,4-diethylpentane-1,5-diol diacrylate; poly(ethylene glycol) diacrylate; 1,6-hexanediol (EO)2 diacrylate; 1,6-hexanediol (EO)5 diacrylate; and alkoxylated aliphatic diacrylate esters. Some non-limiting examples of suitable multifunctional acrylates to be included in the polymerizable material are: trimethylolpropane triacrylate; propoxylated trimethylolpropane triacrylate (e.g., propoxylated (3) trimethylolpropane triacrylate, propoxylated (6) trimethylolpropane triacrylate); trimethylolpropane ethoxylate triacrylate (e.g., n~1.3,3,5); di(trimethylolpropane) tetraacrylate; propoxylated glyceryl triacrylate (e.g., propoxylated (3) glyceryl triacrylate); 1,3,5-adamantanetriol triacrylate; tris (2-hydroxy ethyl) isocyanurate triacrylate; pentaerythritol triacrylate; Trisphenol PA triacrylate; pentaerythritol tetracrylate; ethoxylated pentaerythritol tetracrylate; dipentaerythritol pentaacrylate; tripentaerythritol octaacrylate; trimethylolpropane(PO)n triacrylate (n is 1, 2, 3 . . . trimethylolpropane(EO)n triacrylate (n is 1, 2, 3 . . . ). Examples of the vinyl benzene type of monomers include vinylbenzene (styrene), divinylbenzene (DVB), trivinylbenzene (TVB), 3,3'-divinylbiphenyl, 3,4', 5-trivinylbiphenyl, 3,3',5, 5'-tetravinylbiphenyl, 1,2-bis(3-vinylphenyl)ethane, bis(4-vinylphenyl) ether, bis(3-vinylphenyl) ether. Some non-limiting examples of suitable multifunctional monomers to be included in the polymerizable material are: molecules containing both acrylate functional groups and vinyl groups directly connected to aromatic rings. For example, 3-vinyl benzyl acrylate, 2-(4-vinyl)-phenyl, 1,3-propane diacrylate, 3,5-bivinyl benzyl acrylate, and 5-vinyl, 1,3-xylene diacrylate. Some non-limiting examples of maleimides and bis-maleimides to be included in the polymerizable material are: N-benzylmaleimide; N-cyclohexylmaleimide; N-phenylmaleimide; and bis(3-ethyl-5-methyl-4-maleimidophenyl) methane. Some non-limiting examples of suitable benzoxazines to be included in the polymerizable material are: 6,6'-Methylenebis[3,4-dihydro-3-phenyl-2H-1,3-benzoxazine; and 3,3'-(Methylenedi-4,1-phenylene)bis[3,4-dihydro-2H-1,3-benzoxazine. As also discussed in U.S. Pat. App. Pub. No. 2020/0339828, the formable material may include additives such as stabilizers, dispersants, solvents, surfactants, inhibitors or any combination thereof. The formable material in each MMS being different from each other MMS for different fabrications means that one or more aspects of the composition may be different, i.e., not identical. For example, the formable materials may be different in the selection of the components (i.e., different or additional monomers, different or additional photoinitiators, different or additional surfactants, and/or different or additional solvents) and/or may be different with respect to the amount of each component (i.e., based on the total mass of the formable material, a different amount of monomer, a different amount of photoinitiator, a different amount of surfactant, and/or a different amount of solvent).

As shown in FIG. 5, each MMS generally includes a plurality of conduits 502, a plurality of pumps 504, a plurality of pulsation dampeners 506, a filter 508, and a reservoir 510. The reservoir 510 contains the formable material 124 (fluid, fluid material). The reservoir 510 may be filled with the fluid 124 from a fluid source (not shown) through the conduit 502 connecting the fluid source to the reservoir 510 by action of the appropriate pump 504. Similarly, the reservoir 510 may be drained of the fluid through the conduit 502 connecting the reservoir 510 to the drain by action of the appropriate pump 504. The MMS may further include a pressure sensor 512 and level sensor 514. The fluid in the reservoir 510 is pumped out of the MMS and into the flow system through the conduit 502 heading in the supply direction by action of the appropriate pump 504 in the supply line. After exiting the MMS, the fluid travels through one of various paths described below, depending on the state set by the controller 140. For example, as described below, the fluid may travel to the dispenser(s) 122 in one state (a dispensing state) or return immediately back without traveling to the dispenser(s) 122 in another state (a bypass recycle state). The fluid similarly returns to the reservoir 510 by action of one of the pumps 504 through the conduit 502 heading in the return direction. During exit and return, the pulsation dampeners 506 dampen pulsation of the fluid that is otherwise introduced by the pumps 504. The filter 508 filters the fluid each time the fluid exits through the supply line. The filter may be a polyethylene semiconductor-grade filter with 10 nm particle retention size, for example. The particular filter may be optimized based on the particular fluid being circulated. The applicant has also found that the performance of the system 100 being fed by fluid supply and dispensing system 200 is greatly improved if the formable material is constantly being recirculated through filter even when the formable material is not being used. The filters can continuously remove contaminates and/or larger particles.

Figure 6:
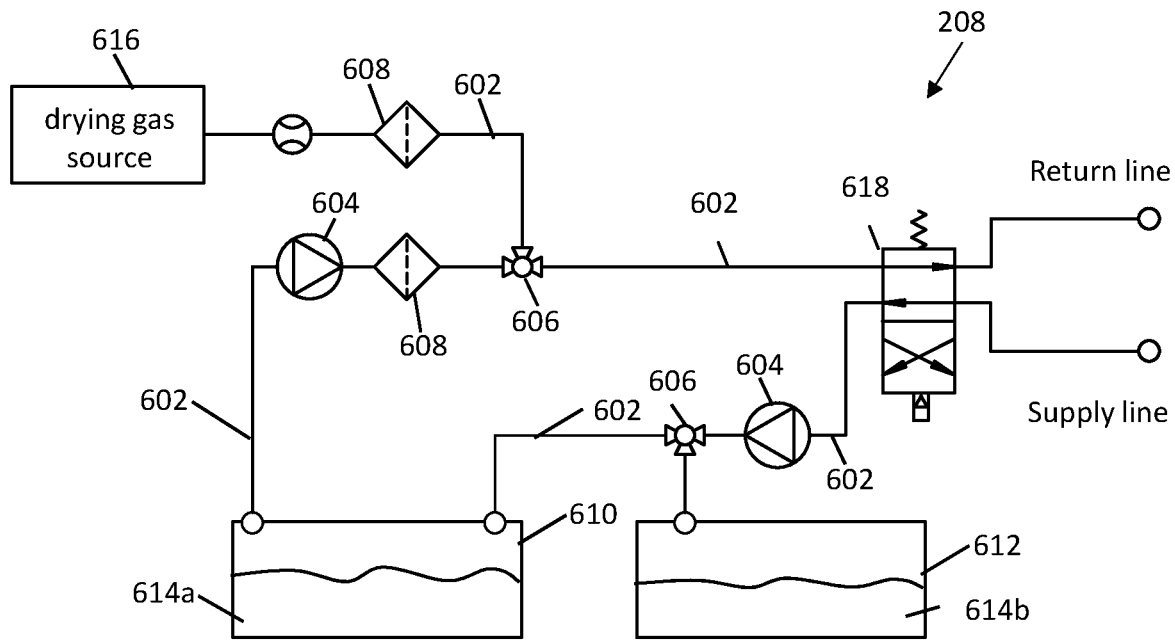
FIG. 6 is a schematic representation of a flush system in accordance with an example embodiment.

FIG. 6 shows a schematic representation of an example embodiment of the flush system 208. As shown in FIG. 6, the flush system generally includes a plurality of conduits 602, a plurality of pumps 604, a plurality of three-way valves 606, a plurality of filters 608, an active reservoir 610, and a waste reservoir 612. The active reservoir 610 contains a flush fluid 614a that is to be sent through the flush system via one of the conduits 602 in the supply direction. The flush fluid may be a solvent that is compatible with the formable materials being dispensed and circulated through the system. Compatible means that the flush fluid will dissolve the formable material without reacting with it. For example, the flush fluid may be isopropyl alcohol, acetone, and/or propylene glycol methyl ether acetate (PGMEA). The waste reservoir 612 contains flush fluid 614b that has already been used and returned to the flush system in the case that flush fluid cannot be further used. The flush fluid in the active reservoir 610 is pumped out of the flush system toward the flow system by action of one the pumps 604 through the conduit 602 heading in the supply direction. After exiting the flush system, the flush fluid travels through one of various paths described below, depending on the state set by the controller 140. For example, as described below, the flush fluid may travel to the dispenser(s) 122 in one state (a dispensing state) or return immediately back without traveling to the dispenser(s) 122 in another state (a bypass recycle state). The flush fluid similarly returns to either the active reservoir 610 or the waste reservoir 612 by action of one of the pumps 604 through the conduit 602 heading in the return direction. In an embodiment, the pump 604 that pulls the fluid through the return line may be a venturi that is used to produce suction. The filter 608 may be the same filters as described above and serves the function of filtering the flush fluid as it exits the active reservoir 610 in the direction of the supply line. The flush system 208 further includes a drying gas source 616 so that a supply of drying gas can be controlled to flow through the conduits 602 in the supply direction. By controlling the three-way valves 606 and the pumps 604, the flush system 608 can be controlled to supply flush fluid 614a from the active reservoir 610 through the supply line, to provide drying gas from the drying gas source 616 through the supply line, and to either have the flush fluid returning through the return line to flow back to the active reservoir 610 or to flow into the waste reservoir 612. The flush system 208 may include a valve assembly 618 that includes one or more valves, two input ports, and two output ports. The valve assembly 618 can be switched from between two states. In the first state the valve assembly 618 provides: a first fluid connection between the return pump 604 and the return line; and a second fluid connection between the supply line three-way valve 606 and the supply line. In the second state the valve assembly 618 provides: a third fluid connection between the return pump 604 and the supply line; and a fourth fluid connection between the supply line three-way valve 606 and the return line.

It should be noted that FIGS. 5 and 6 are generic and shows all possible flow paths to/from the MMS/flush systems, as opposed to particular instances where certain flow paths are active and certain flow paths are inactive. That is, FIGS. 5 and 6 do not show any particular state/moment of the method described herein. The controller 140 is configured to control all of the controllable elements of MMS and flush systems, i.e., pumps, valves, etc., which changes the flow states.

Method of Switching Dispensed Fluid

Figure 7:
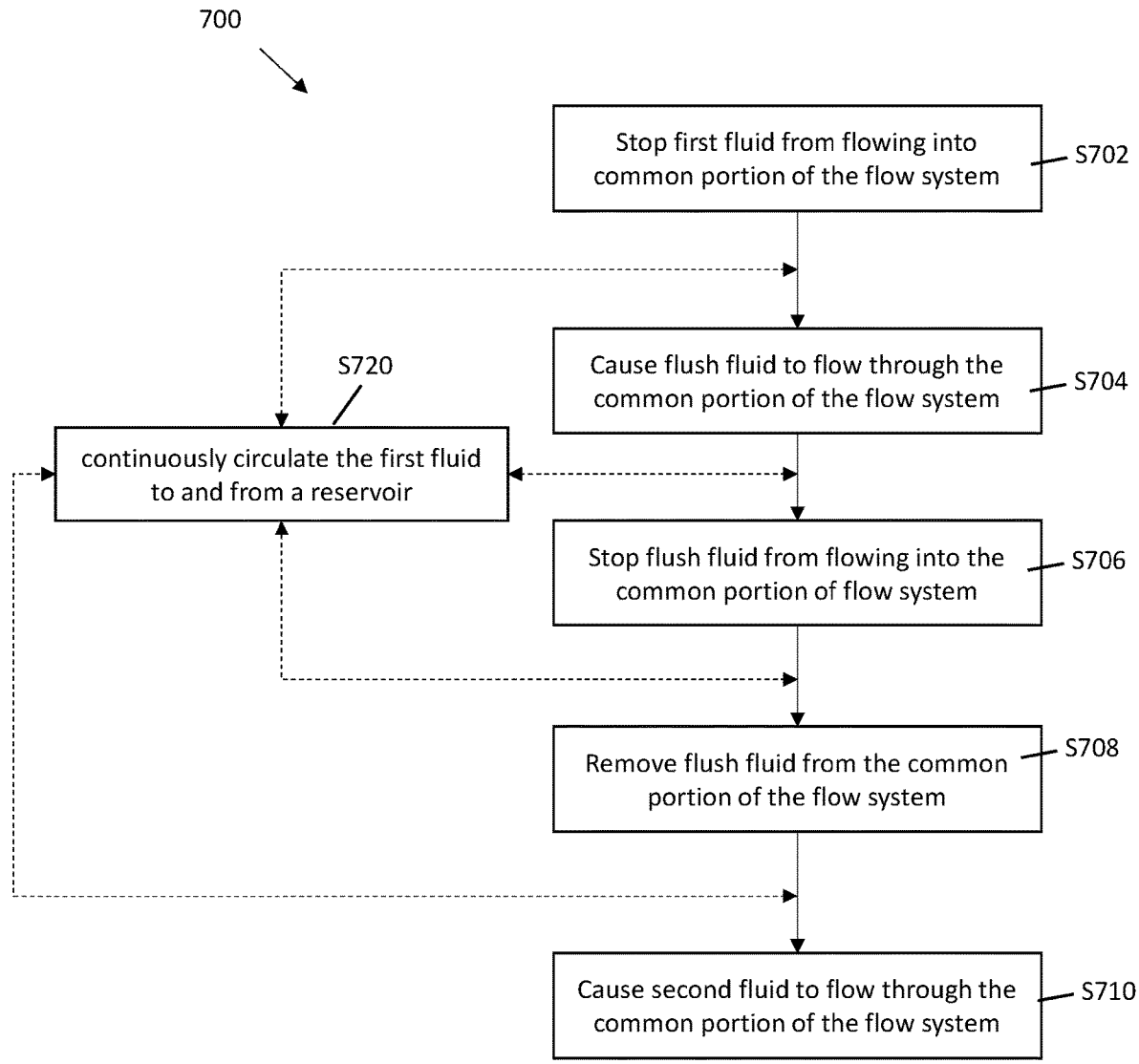
FIG. 7 is a flow chart of a method of switching a first fluid supplied to a dispenser with a second fluid in accordance with an example embodiment.

Using controller 120 to control the various pumps, valves, etc. of the supply and dispensing system 200, a method 700 of switching a fluid supplied to dispenser(s) with a second liquid can be performed. FIG. 7 is a flow chart of the method 700.

As shown in FIG. 7, the first step in the method 700 is step S702, where a first fluid is stopped from flowing into the common portion 228 of the supply and dispensing system 200 (flow system). The common portion 228 is the portion of the supply and dispensing system 200 that includes the supply manifold 210, the one or more dispensers 122, the return manifold 212, a supply portion 230 providing fluid communication between the supply manifold 210 and the one or more dispensers 122, and a return portion 232 providing fluid communication between the one or more dispensers 122 and the return manifold 212. The common portion 228 further includes the pressure manifold 214. The supply portion 230 includes a conduit 234a connecting the supply manifold 210 to the pressure manifold 214 and a conduit 234b connecting the pressure manifold 214 to the one or more dispensers 122. The return portion 232 includes a conduit 236a connecting the one or more dispensers 122 to the pressure manifold 214 and a conduit 236b connecting the pressure manifold 214 to the return manifold 212. The common portion 228 does not include the conduits connecting the MMS and flush systems to the supply manifold, does not include the conduits connecting the return manifold to the MMS and flush systems, does not include the recycle bypass, and does not include any of the three-way valves or any of the valves at the supply and return manifold. Similarly, the common portion 228 does not include any of the components of the MMS and flush systems. In other words, the common portion 228 does not include any of the components upstream of the supply manifold nor any of the components downstream of the return manifold.

Figure 8:
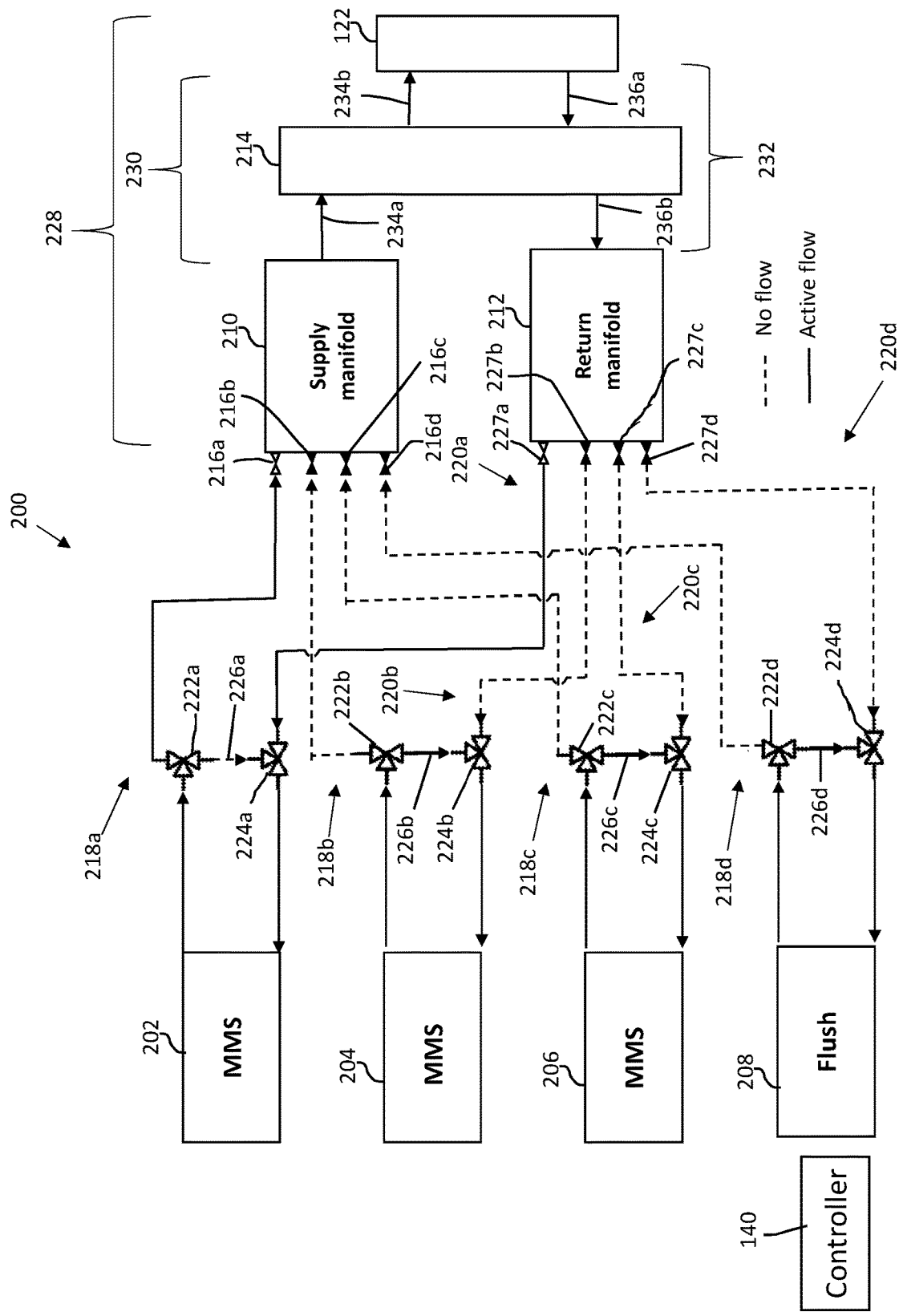
FIG. 8 is a schematic representation of the flow system of FIG. 4 in a state when the first fluid is flowing into a common portion of the flow system and with all other fluids in a recycle bypass.

FIG. 8 shows the supply and dispensing system 200 at a moment just before performing step S702. That is, the start of the method 700 presumes a preexisting active state of the supply and dispensing system 200 where one of the MMS is actively providing fluid (formable material) to the dispenser and back to the MMS. In the example embodiment shown in FIG. 8, the first MMS 202 is the active MMS, i.e., the MMS providing the fluid that is actively being dispensed from the dispenser(s) 122. However, any one of the MMS may be active prior to step S702. As noted above, the details of the first MMS 202 is shown in FIG. 5. The fluid material 124 begins in the reservoir 510. The fluid material 124 is pumped from the reservoir 510 using the pump 502 in the supply line, through the filter 508, through the pulsation dampener 506 in the supply line, and then out of first MMS 202. After exiting the first MMS 202, the fluid material enters the portion of the flow system illustrated in FIG. 8.

In FIG. 8, the solid lines indicate an "active flow" state and the dashed lines indicate a "no flow" state. As shown in FIG. 8, prior to step S702, fluid is flowing from the first MMS 202 into the supply three-way valve 222a, where the supply three-way valve 222a is directing the flow through the supply flow path 218a while blocking the flow through the recycle bypass 226a. Thus, the fluid material coming from the first MMS 202 continues to flow to the supply manifold 210 via the open supply valve 216a (the other supply valves being in a closed state), out of the supply manifold 210, into the pressure manifold 214 via the conduit 234a, and into the one or more dispensers 122 via the conduit 234b. Next, the fluid material that is not dispensed travels back through the pressure manifold 214 via the conduit 236a, to the return manifold 212 via the conduit 236b, out the return manifold 212 via the return valve 227a (the other return valves being in a closed state), and through the return three-way valve 224a. The return three-way valve 224a directs the returning fluid back into the first MMS 202. Thus, in state shown in FIG. 8, the fluid material coming from the first MMS 202 travels from the first MMS 202 to the one or more dispensers 122 and returns back to the first MMS 202. Once returning to the first MMS 202, as shown in FIG. 5, the fluid material is pumped by the pump 502 in the return line, through the pulsation dampener 506 in the return line, and back into the reservoir 510. In this flow state, the pumps 502 are configured to supply a positive pressure on the fluid entering the dispenser(s) 122 and negative pressure on the fluid exiting the dispenser(s) 122. The differential between the positive and negative pressure can be used to control the meniscus of fluid in the nozzles of the dispenser(s) 122.

As also shown in FIG. 8, in the state in which only the fluid material of the first MMS 202 is being supplied, all of the other systems are in a recycle bypass state. In the recycle state, the fluid material is flowing from each of the other MMS and flush systems and be rerouted back to the respective systems from which it came. In particular, for example, in the case of the second MMS 204, fluid material is exiting the second MMS 204 and entering the supply three-way valve 222b. In the recycle bypass state, the supply three-way valve 222b blocks the flow of the fluid material from entering into the supply flow path 218b. Instead, the three-way valve 222b causes the fluid material to move through the recycle bypass 226b and into the return three-way valve 224b. In the recycle bypass state, the return three-way valve 224*b* further directs the fluid material flowing from the supply three-way valve 222*b* back to the second MMS 204. That is, in recycle bypass state, instead of the fluid material traveling through the supply path 218*b*, to the one or more dispensers 122, and then returning through the return flow path 220*b*, the fluid material bypasses all of those components and returns directly to the second MMS 204. Turning to FIG. 5, regardless of whether the fluid returns to the second MMS 202 via the recycle bypass path or returns after the dispensing route, the treatment of the fluid material returning to the second MMS 204 is the same. That is, the fluid is similarly pumped into the reservoir 510 and back out of the system through the filter 508. Accordingly, in the bypass recycle state, the fluid material is continuously cycling into and out of the MMS and passing through the filter 508 on every cycle. The filtering of the fluid material in every cycle provides the advantage of minimizing contamination in the fluid. Thus, continuously recycling the fluid minimizes, avoids, and/or reduces contamination in the fluid.

The description of the fluid traveling out of and back into the second MMS 204 above is essentially the same as the fluid that travels out of and back into the third MMS 206 and the flush system 208 shown in FIG. 8. That is, as shown in FIG. 8, the third MMS 206 is similarly in the recycle bypass state where the fluid material exits the third MMS 206, and is routed directly back to the third MMS 206 via the three-way valves 222*c*, 224*c* and the recycle bypass 226*c*. Likewise, fluid material is also exiting the flush system 208 and being routed directly back to the flush system 208 via the three-way valves 222*d*, 224*d* and the recycle bypass 226*d*. In the case of the flush system 208, the returning fluid may or may not be reused. In the case that the flush fluid is reused, the three-way valve 606 in the return line is set to direct the returning flush fluid to travel back into the active reservoir 610 while blocking the returning flush fluid from entering the waste reservoir 612. The flush fluid 614*a* in the active reservoir 610 is then pumped back out through the filter 608 through the supply line. In contrast, when the returning flush fluid is not being reused, the three-way valve 606 in the return line is set so that the returning flush fluid is directed to the waste reservoir 612. In this case, the supply of flush fluid continues from the active reservoir 610, but none of the returning flush fluid comes back into the active reservoir 610. In either configuration, the three-way valve 606 in the supply line is set so that the drying gas does not enter the supply line and only the flush fluid 614*a* enters the supply line. In an alternative embodiment, the flushing fluid is never recirculated when not being used for flushing. In an alternative embodiment, flushing fluid is sometimes recirculated when not being used for flushing, when filtering of the flushing fluid is desired.

Figure 9:
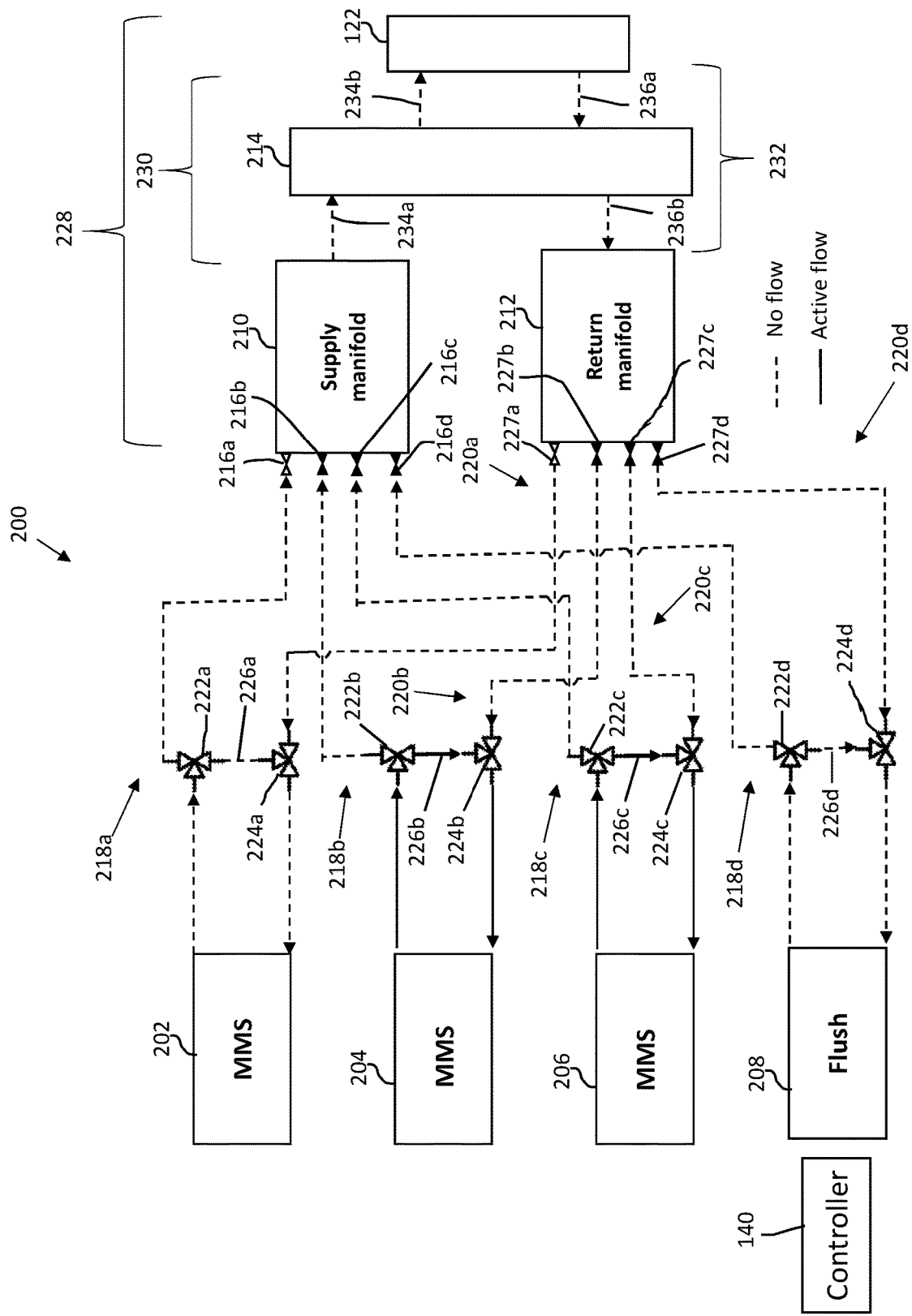
FIG. 9 is a schematic representation of the flow system of FIG. 4 in a state when the first fluid is stopped from flowing and a flush fluid is stopped from flowing, with a third and fourth fluid in a recycle bypass.

FIG. 9 shows the supply and dispensing system 200 at a moment after performing step S702. That is, FIG. 9 shows the moment that the first fluid material (in this case the fluid material coming from the first MMS 202) is stopped from flowing into the common portion 228 of the flow system. As shown in FIG. 9, as indicated by the dashed "no flow" lines, fluid material is not flowing into the common portion 228. All of the fluid that was entering the system from the first MMS 202 is returned to the first MMS 202 and enters the reservoir 510. Further, the flow of fluid material is stopped from flowing out of the first MMS 202. That is, at this moment, the pumps 502 are turned off so fluid is no longer flowing out of the reservoir 510 and into the supply line. In an embodiment, the supply pump of the MMS 202 is turned off, then the return pump of the MMS 202 is turned off a few moments later. At the same time, as also shown in FIG. 9, the second MMS 204 and the third MMS 206 are held in the recycle bypass state, i.e., the same state as in FIG. 8. That is, the fluid material coming out of the second MMS 204 and the third MMS 206 continues to follow the recycle bypasses 226*b*, 226*c*, respectively, without being shut off, even as the flow of the fluid material from the first MMS 202 is terminated.

Because the flush system 208 is about to be used to flush out the common portion 228, in the illustrated example embodiment, the flow of flush fluid from the flush system 208 has also been terminated at the moment shown in FIG. 9. That is, while the fluid material of the flush system 208 had been in the recycle bypass state when the fluid material of the first MMS 202 was actively flowing to the dispenser (s) 122, the recycle bypass of the flush fluid from the flush system may similarly be terminated. Thus, as shown in FIG. 9 via the dashed "no flow" lines, there is no fluid material exiting the flush system 208 at the moment shown in FIG. 9. That is, at this moment the pumps 604 are turned off so that no flush fluid is exiting or entering the flush system 208.

Figure 10:
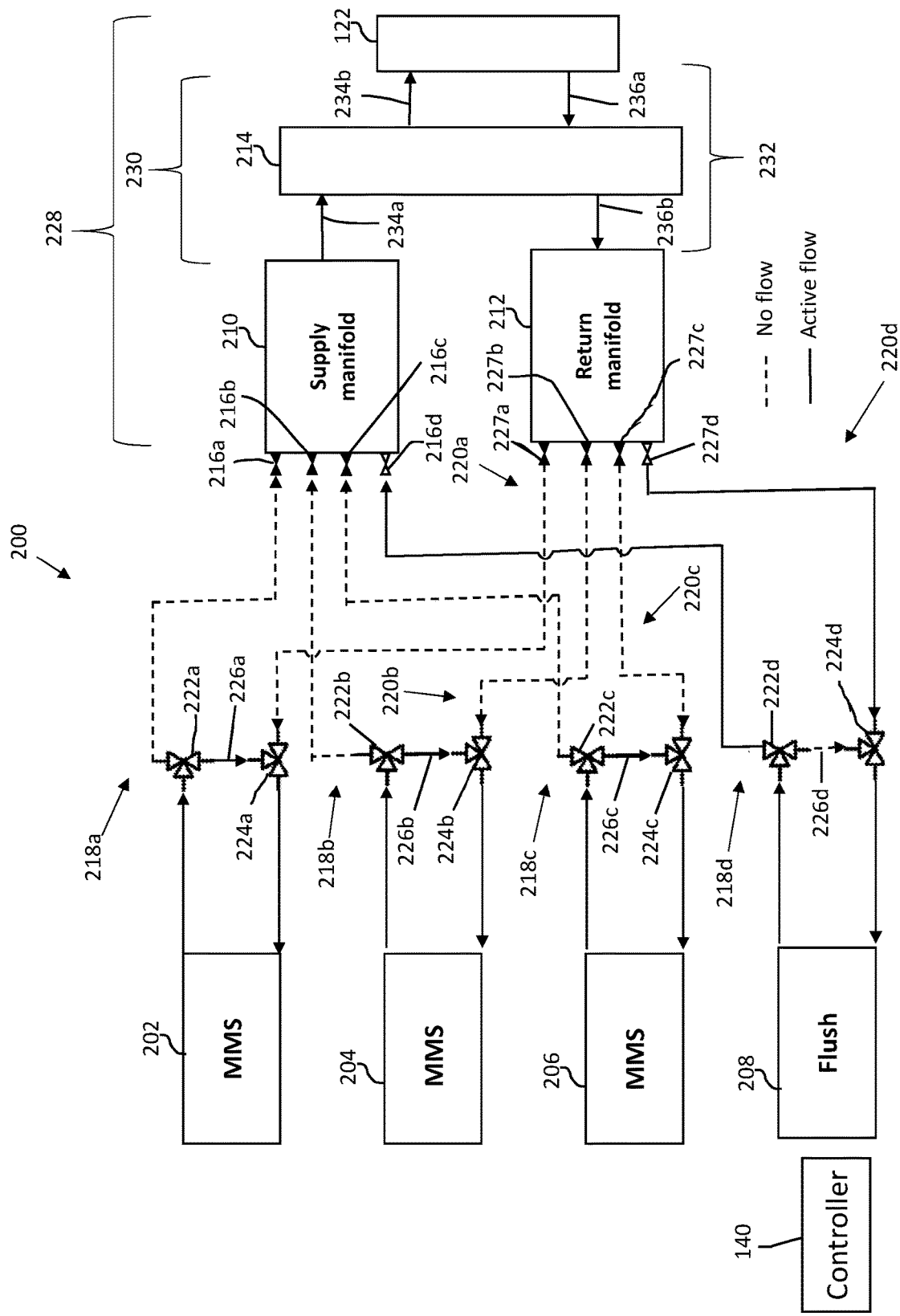
FIG. 10 is a schematic representation of the flow system of FIG. 4 in a state when a flush fluid is flowing through the common portion of the flow system with all other fluids in a recycle bypass.

After completing step S702, the method may proceed to step S704, where the flush fluid is caused to flow through the common portion 228 of the supply and dispensing system 200. FIG. 10 shows the supply and dispensing system 200 at the moment of performing step S704. As shown in FIG. 10, represented by the solid "active flow" lines, the flush fluid is departing the flush system 208 and traveling through the supply three-way valve 222*d* toward the supply manifold 210. The supply three-way valve 222*d* is controlled to have a configuration where the flush fluid is blocked from traveling through the recycle bypass 226*d* and instead enters into the supply manifold 210 via the now-opened fourth valve 216*d*. The flush fluid travels through the supply portion 230, i.e., to the pressure manifold 214 via the conduit 234*a* and to the dispenser(s) 122 via the conduit 234*b*. Some of the flush fluid is dispensed out of the dispenser(s) 122. The flush fluid that is not dispensed travels through the return portion 232, i.e., to the pressure manifold 214 via the conduit 236*a* and then to the return manifold via the conduit 236*b*. The flush fluid exits the return manifold 212 via the return valve 227*d* (the other return valves being in a closed state), and through the return three-way valve 224*d*. The return three-way valve 224*d* directs the returning flush fluid back into the flush system 208. Thus, in state shown in FIG. 10, the flush fluid coming from the flush system 208 travels from the flush system 208 to the one or more dispenser(s) 122 and returns back to the flush system 122. While the flushing fluid is being supplied the dispenser(s) 122 may be in a state (for example a jetting state, cleaning state, flushing state, etc.) that allows the formable material to be removed from the nozzles of the dispenser(s) 122. The dispenser(s) may also bin in a maintenance position which ensures that any fluid that does exit the dispenser(s) does not impact the performance of the system 100.

During the state shown in FIG. 10, the pump 604 in the supply line is actively pumping the flush fluid 614*a* from the active reservoir 610, through the three-way valve 606 in the supply line, and out the supply line, where the three-way valve 606 in the supply line is set so that only the flush fluid passes through and not the drying gas. At the same time, the pump 604 in the return line is actively pumping the non-dispensed flush fluid back into the return line and either back into the active reservoir 610 or into the waste reservoir 612 depending on the setting of the three-way valve 606 in the return line (i.e., depending on whether the flush fluid is to be recycle or is to be sent to waste).

FIG. 10 also illustrates a moment where the step S720 of beginning to continuously circulate the first liquid to and from the reservoir 510 has been performed. That is, in one example embodiment, the step 720 of beginning to continuously circulate the first liquid to and from the reservoir 510 can be performed immediately after the step S702. Once the circulating has begun in step S720, the circulation is maintained throughout all of the remaining steps. However, step S720 need not be performed immediately after step S702. The step S720 of beginning the continuous circulation of the first fluid can be performed at any point in the method all the way up to and including the below-discussed step S710 of causing the second liquid to flow through the common portion 228 of the flow system. In other words, the step S720 of beginning the recycle flow of the first liquid can be performed at any point after step S702 and prior to or during step S720.

Next, the method may proceed to step S706, where the flush fluid is stopped from flowing into the common portion 228 of the flow system. This can be achieved by stopping the pumping of the flush fluid from the active reservoir 610. Specifically, the pump 604 in the supply line of the flush system 208 may stop pumping the flush fluid 614a through the supply line.

After stopping the flow of flush fluid to the common portion 228 of the flow system 200, the method may proceed to step S708 where the flush fluid is removed from the common portion 228 of the flow system. Step S708 may include using the pump 604 in the return line of the flush system 208 to continue to pump the remaining flush fluid in the flow system back into the either the active reservoir 610 or the waste reservoir 612. Step S708 may further include a subsequent step of flowing a drying gas through the common portion 228 to remove any remaining flush fluid. The drying gas serves the function of removing any flush liquid that may still be in the lines. The drying gas may be any inert gas such as clean dry air, nitrogen, argon, neon, and/or helium, for example. Preferably, the drying gas is clean dry air and/or nitrogen. As noted above, the flush system 208 includes a drying gas source 616 which can enter the supply line of the flush system 208 via the—three way valve 606 in the supply line. The three-way valve 606 in the supply line of the flush system 208 is actuated so that the drying gas enters the supply line. The drying gas may then flow through the same "active lines" shown in FIG. 10. That is, one embodiment, the flow of the drying gas follows the same travel path as the flush fluid described above, including flowing through the common portion 228. In such a case where the drying gas follows the exact same flow path as the flush fluid, the drying gas will ultimately be expelled into the waste reservoir 612 or the active reservoir 610. In another embodiment, an additional valve may be included in the flow path just downstream of the return manifold 212 so that the drying gas can be vented prior to returning to the flush system 208. Because the nozzles of the dispenser(s) are open to air, in order for the flushing fluid and/or drying gas to be removed from the supply line, step S708 may include a step of switching the valve assembly 618 from the first state to the second state so that the flushing fluid and/or drying gas remaining in the supply line is also removed.

Figure 11:
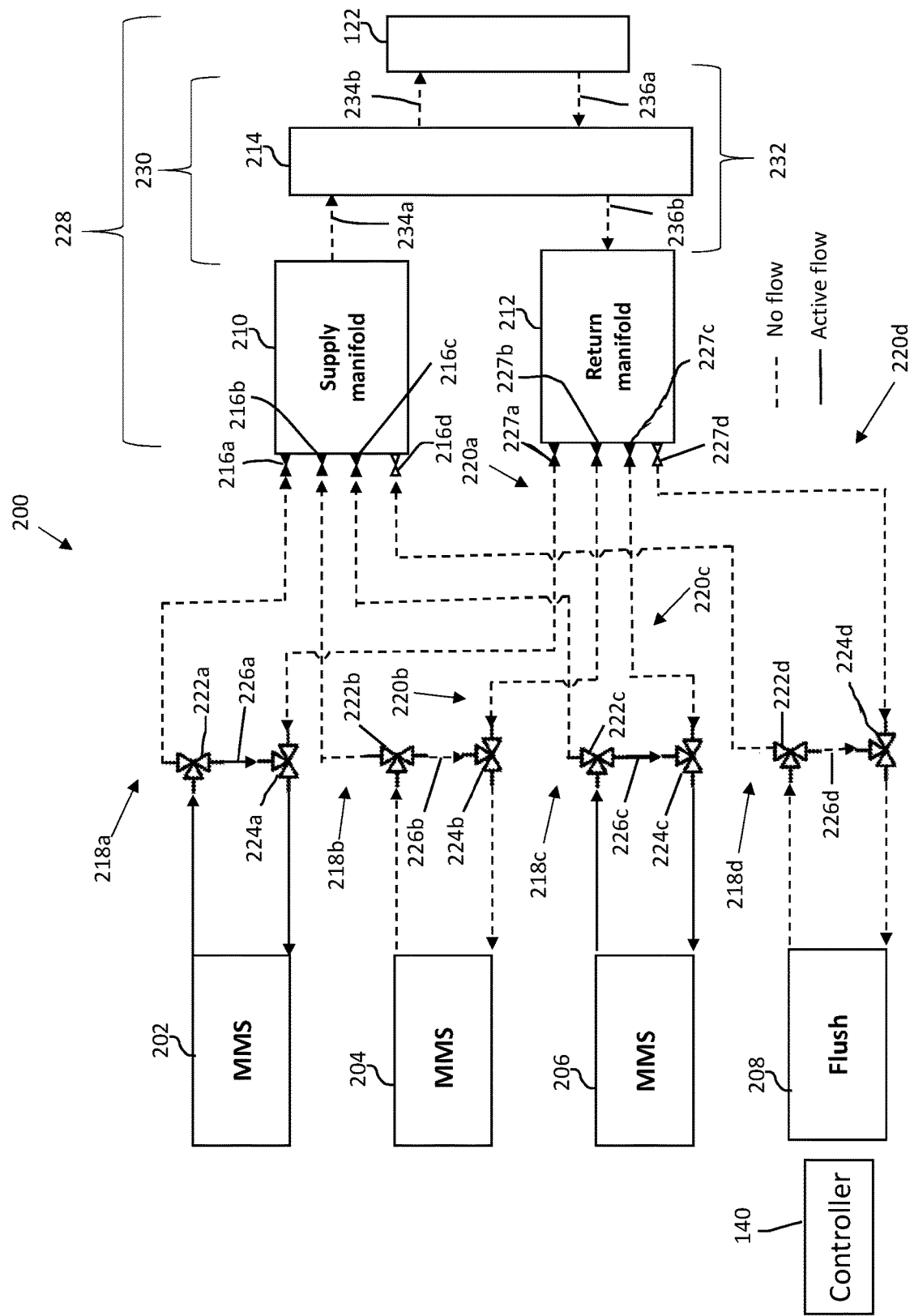
FIG. 11 is a schematic representation of the flow system of FIG. 4 in a state when the flush fluid is stopped from flowing and a second fluid is stopped from flowing, with the first fluid and the third fluid in a recycle bypass.

After completing step S708, the method may proceed to step S710, where the second fluid of the second MMS 204 is caused to flow through common portion 228 of flow system 200. FIG. 11 shows the flow system 200 at a moment just prior to step S710. As part of preparing the flow of the second fluid to flow from the second MMS 204 into the common portion 228 of the flow system 200, an intermediate step may be performed where the flush system 208 is completely stopped from sending or returning any fluid (flush or drying gas). As shown in FIG. 11, represented by the dashed "no flow" lines, the flush fluid and gas is no longer departing the flush system 208 at all. That is, neither the flush fluid nor the drying gas is being supplied by the flush system 208 and is therefore neither flowing to/from the dispenser(s) 122 nor traveling through the recycle bypass 226d. Similarly, as also shown in FIG. 11 via the dashed "no flow" lines, as part of the intermediate preparation step, the second fluid from the second MMS 204 may also be stopped from flowing from the second MMS 20. That is, the second fluid is not being supplied by the second MMS 204 and is therefore neither flowing to/from the dispenser(s) 122 nor traveling through the recycle bypass 226b. Regarding the first MMS 202, however, as noted above, because the step S720 of continuously recycling the first fluid from the first MMS 202 via the recycle bypass 226a is maintained through the method, FIG. 11 shows "active flow" solid lines exiting the first MMS 202 and returning back to the first MMS 202 via the recycle bypass 226a. Similarly, because the illustrated example embodiment is showing the process of switching to the second fluid of the second MMS 204, the third fluid from the third MMS 206 is also shown traveling out of the third MMS 206 and returning directly back to the third MMS 206 via the recycle bypass 226c.

Figure 12:
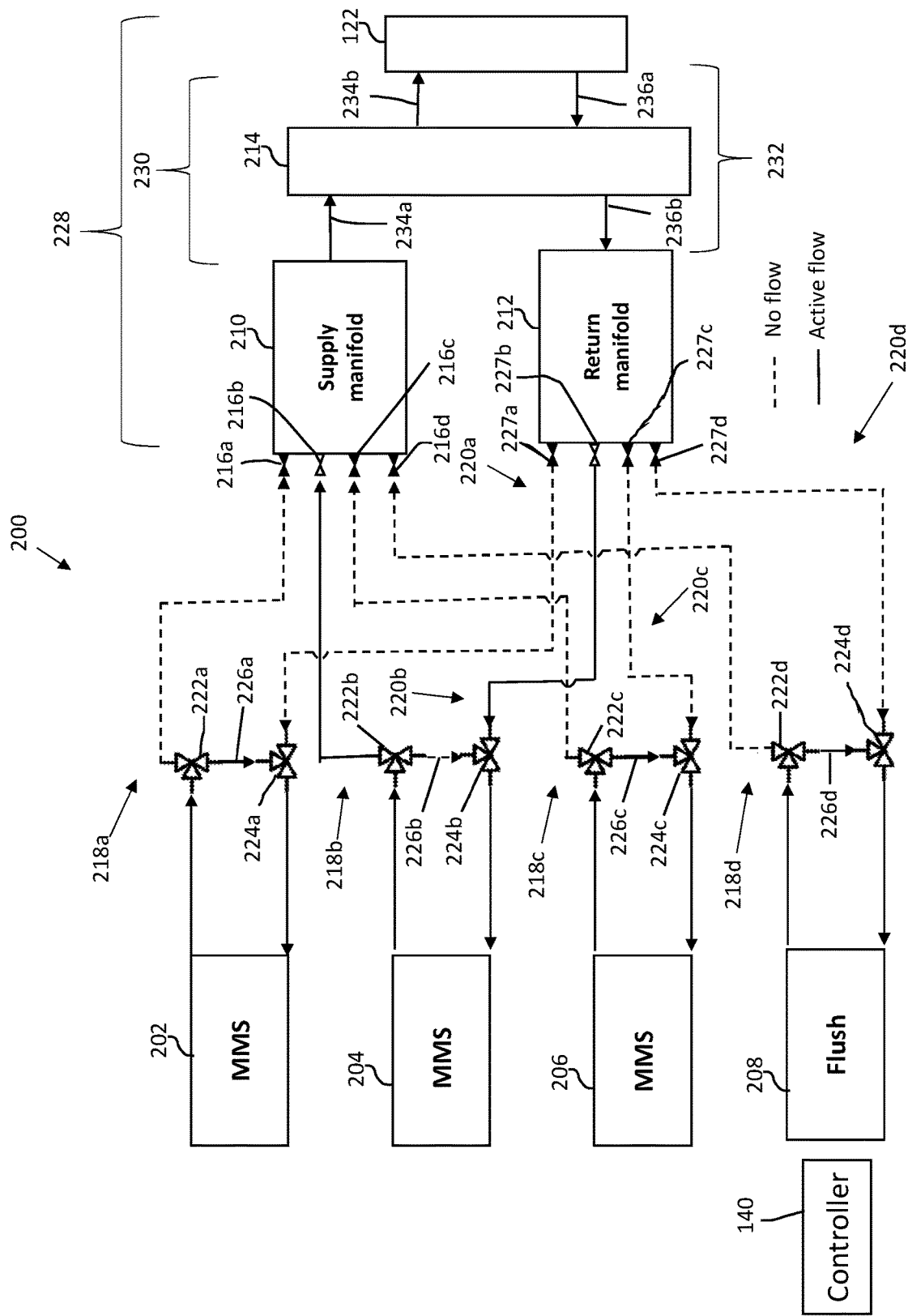
FIG. 12 is a schematic representation of the flow system of FIG. 4 in a state when the second fluid is flowing into the common portion of the flow system, with all other fluids in a recycle bypass.

Turning to FIG. 12, after achieving the state shown in FIG. 11, where the first MMS 202 and the third MMS are in a bypass recycle state, while the second MMS 204 and the flush system 208 are in a stopped state, the method may then proceed to performing step S710 where the second fluid of the second MMS 204 is caused to flow through common portion 228 of flow system 200. FIG. 12 shows a state where the second fluid of the second MMS 204 is flowing through the common portion 228, to the dispenser(s) 122 and eventually back to the second MMS 204. In particular, as shown in FIG. 12, fluid is flowing from the second MMS 204 into the supply three-way valve 222b, where the supply three-way valve 222b is directing the flow through the supply flow path 218b while blocking the flow through the recycle bypass 226b. Thus, the fluid material coming from the second MMS 204 continues to flow to the supply manifold 210 via the open supply valve 216b (the other supply valves being in a closed state), out of the supply manifold 210, into the pressure manifold 214 via the conduit 234a, and into the one or more dispenser(s) 122 via the conduit 234b. Next, the fluid material that is not dispensed travels back through the pressure manifold 214 via the conduit 236a, to the return manifold 212 via the conduit 236b, out the return manifold 212 via the return valve 227b (the other return valves being in a closed state), and through the return three-way valve 224b. The return three-way valve 224b directs the returning fluid back into the second MMS 204. Thus, as noted above, in the state shown in FIG. 12, the fluid material coming from the second MMS 204 travels from the second MMS 204 to the one or more dispensers 122 and returns back to the second MMS 204. Once returning to the second MMS 204, the same path is traveled as discussed above with respect to the first MMS 202. That is, as shown in FIG. 5, the second fluid material travels through the pulsation dampener 506 of the return line and back into the reservoir 510. At the same time, the fluid in reservoir 510 is flowing out the supply line passing through the filter 508 and the pulsation dampener 506 of the supply line.

As also shown in FIG. 12, in the state in which only the fluid material of the second MMS 204 is being supplied, all of the other systems are in a recycle bypass state, as discussed above. Thus, upon reaching the state shown in FIG. 12 by performing the method 700, the system 200 has switched from supplying a first fluid from a first MMS 202 to the dispenser(s) to supplying a second fluid from a second MMS 204 without having any of the previous material remaining in the common portion 228. Comparing FIG. 8 to FIG. 12 shows the initial flow state compared to the final switched flow state, i.e., the state prior to performing the method 700 and the state after completing the method 700. As seen by comparing these figures, the flow system 200 is similar in each state in that in each state only one fluid is being provided to the dispenser(s) 122 while all the other fluids are in a recycle state. The only difference is that in FIG. 8 the first fluid from the first MMS 202 is being supplied, while in FIG. 12 the second fluid from the second MMS 204 is being supplied. Dispenser(s) 122 are now being supplied with fluid from the second MMS 204. The system 100 may then start using the fluid from the second MMS 204 during the dispensing step S302 of the process 300. Prior to the Process 300 being implemented, the dispenser(s) may go through a testing procedure to ensure all of the nozzles of the dispenser(s) are working correctly.

The method described herein can also be applied to switch from any one MMS to any other MMS. That is, while the illustrated example embodiment starts with the first MMS 202 and switches to the second MMS 204, the same method can be applied to switch from the first MMS 202 to the third MMS 206, the second MMS 204 to the third MMS 206, the third MMS 206 to the first MMS 202, the third MMS 206 to the second MMS 204, and every other permutation. Furthermore, while only three MMS are illustrated in the example embodiment, any number of MMS can be used in a single system, where additional lines and additional valves are added to the supply and return manifolds.

As noted above, the step S720 can be performed at any moment during the process after step 702 all the way up to and including at the same as step S710. That is, the step of continuously circulating the first liquid (i.e., recycle bypass), can begin as early as just after stopping the flow of the first fluid to the common portion of the flow system and begin as late as the moment when the fluid from another MMS enters the common portion of the flow system. Once the continuous recycle bypass circulation begins, it may be maintained throughout the entire time that any other fluid is passing to/from the dispenser(s). In other words, once the recycle bypass starts for the fluid previously being dispensed, it may stay in the recycle bypass state indefinitely until it is time to return to dispensing that fluid again. For example, a fluid from one of the MMS may be dispensed over the course of several hours to several weeks where the other fluids in the other MMS are continuously recycled during this entire time.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. A method of switching a first fluid supplied to a dispenser with a second fluid, the method comprising:
stopping the first fluid from flowing into a common portion of a flow system, the common portion including:
a supply manifold;
the dispenser;
a return manifold;
a supply path providing fluid communication between the supply manifold and the dispenser; and
a return path providing fluid communication between the dispenser and the return manifold,
causing a flush fluid to flow through the common portion of the flow system;
stopping the flush fluid from flowing into the common portion of the flow system;
removing the flush fluid from the common portion of the flow system;
causing the second fluid to flow through the common portion of the flow system; and
continuously circulating the first fluid to and from a reservoir without the first fluid entering the common portion of the flow system,
wherein the continuously circulating of the first fluid begins a) after stopping the first fluid from flowing into the common portion of the flow system and b) prior to or during the second fluid flowing through the common portion of the flow system.

2. The method of claim 1, further comprising maintaining the continuously circulating of the first fluid as long as the second fluid flows through the common portion of the flow system.

3. The method of claim 1, wherein the continuously circulating of the first fluid begins simultaneously with causing the flush fluid to flow through the common portion of the flow system.

4. The method of claim 1, wherein the continuously circulating of the first fluid begins simultaneously with causing the second fluid to flow through the common portion of the flow system.

5. The method of claim 1, wherein both the first fluid and second fluid include a polymerizable material.

6. The method of claim 1, wherein the first fluid is different from the second fluid.

7. The method of claim 1, further comprising continuously circulating a third fluid to and from a reservoir without the third fluid entering the common portion of the flow system.

8. The method of claim 1, wherein the removing of the flush fluid further comprises causing a drying gas to flow into the common portion of the flow system.

9. The method of claim 1, wherein the common portion of the flow system further comprises a pressure manifold.

10. The method of claim 1, further comprising, after removing the flush fluid from the common portion of the flow system, continuously circulating the flush fluid to and from a flush reservoir without the flush fluid entering the common portion of the flow system.

11. The method of claim 1, further comprising dispensing the first fluid from the dispenser prior to stopping the first fluid from flowing into the common portion of the flow system.

12. The method of claim 7,
wherein the first fluid is different from the second and third fluid; and
wherein the second fluid is different from the third fluid.

13. The method of claim 7, wherein the continuously circulating of the third fluid begins prior to the stopping of the first fluid and is maintained through the causing of the second fluid to flow through the common portion of the flow system.

14. The method of claim 8, wherein the drying gas is nitrogen and/or clean dry air.

15. The method of claim 9, wherein the supply path includes supply conduits connecting the supply manifold to the pressure manifold and connecting the pressure manifold to the dispenser.

16. The method of claim 11, further comprising dispensing the second fluid from the dispenser after causing the second fluid to flow through the common portion of the flow system.

17. The method of claim 15, wherein the return path includes return conduits connecting the dispenser to the pressure manifold and connecting the pressure manifold to the return manifold.

18. A method of making an article comprising:
stopping a first fluid from flowing into a common portion of a flow system, the common portion including:
a supply manifold;
a dispenser;
a return manifold;
a supply path providing fluid communication between the supply manifold and the dispenser; and
a return path providing fluid communication between the dispenser and the return manifold,
causing a flush fluid to flow through the common portion of the flow system;
stopping the flush fluid from flowing into the common portion of the flow system;
removing the flush fluid from the common portion of the flow system;
causing a second fluid to flow through the common portion of the flow system;
continuously circulating the first fluid to and from a reservoir without the first fluid entering the common portion of the flow system,
wherein the continuously circulating of the first fluid begins a) after stopping the first fluid from flowing into the common portion of the flow system and b) prior to or during the second fluid flowing through the common portion of the flow system;
dispensing the second fluid onto a substrate using the dispenser;
forming a pattern or a layer of the second fluid dispensed on the substrate; and
processing the formed pattern or layer to make the article.

* * * * *